US009009137B2

(12) United States Patent
Khosravy et al.

(10) Patent No.: US 9,009,137 B2
(45) Date of Patent: Apr. 14, 2015

(54) QUERY MODEL OVER INFORMATION AS A NETWORKED SERVICE

(75) Inventors: Moe Khosravy, Bellevue, WA (US); Lukasz Gwozdz, Seattle, WA (US); Christian Liensberger, Bellevue, WA (US); Gregory David Swedberg, Bellevue, WA (US); René Jacco Bouw, Kirkland, WA (US); Roger Soulen Mall, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 938 days.

(21) Appl. No.: 12/781,957

(22) Filed: May 18, 2010

(65) Prior Publication Data

US 2011/0225143 A1 Sep. 15, 2011

Related U.S. Application Data

(60) Provisional application No. 61/313,184, filed on Mar. 12, 2010.

(51) Int. Cl.
*G06F 17/30* (2006.01)

(52) U.S. Cl.
CPC .................................. *G06F 17/30471* (2013.01)

(58) Field of Classification Search
USPC .......................................... 707/713–769, 781
See application file for complete search history.

(56) References Cited

U.S. PATENT DOCUMENTS 5,873,075 A * 2/1999 Cochrane et al. ..................... 1/1
6,253,195 B1 * 6/2001 Hudis et al. ................... 707/713
6,442,559 B1 8/2002 Martinsen
6,574,639 B2 * 6/2003 Carey et al. ................... 707/704
6,772,396 B1 * 8/2004 Cronin et al. ................. 715/202
6,957,214 B2 * 10/2005 Silberberg et al. ............ 707/763
7,331,015 B2 * 2/2008 Hays et al. .................... 715/248

(Continued)

FOREIGN PATENT DOCUMENTS

EP 1881447 A1 1/2008
EP 2 015 196 A1 1/2009

(Continued)

OTHER PUBLICATIONS

"Windows Azure Platform", Mar. 9, 2010, 3 pages.

(Continued)

*Primary Examiner* — Hanh Thai
(74) *Attorney, Agent, or Firm* — Nicholas Chen; Kate Drakos; Micky Minhas

(57) ABSTRACT

Data is published by publishers to an information service configured to receive data sets and allow consumers to consume the data sets via queries. Structural information of the data sets (e.g., column information) is presented to the publishers to select which information of the data sets can be a search parameter and which information can be returned in query results. Query interfaces are automatically created based on the selections by the publisher, and the back end databases are optimized for such query interfaces, e.g., creation of indexes based on the search parameters or query results selected by the publisher. A query aggregator can automatically combine a given query interface with other query interfaces to form more complicated (but still permitted) queries based on the intersection of permissions for the given query interface and the other query interfaces.

39 Claims, 20 Drawing Sheets

(56) References Cited

U.S. PATENT DOCUMENTS

| | | | | |
|---|---|---|---|---|
| 7,383,253 | B1 * | 6/2008 | Tsimelzon et al. | 707/610 |
| 7,483,870 | B1 * | 1/2009 | Mathew et al. | 1/1 |
| 7,751,417 | B2 * | 7/2010 | Cherny et al. | 370/412 |
| 7,769,769 | B2 * | 8/2010 | Rasmussen | 707/756 |
| 7,814,093 | B2 * | 10/2010 | Meyers et al. | 707/714 |
| 7,840,515 | B2 * | 11/2010 | Ozdemir et al. | 706/47 |
| 7,895,191 | B2 * | 2/2011 | Colossi et al. | 707/717 |
| 7,949,652 | B2 * | 5/2011 | Dettinger et al. | 707/713 |
| 8,131,739 | B2 * | 3/2012 | Wu et al. | 707/758 |
| 8,176,476 | B2 * | 5/2012 | Li et al. | 717/130 |
| 8,386,450 | B2 * | 2/2013 | Simmen | 707/705 |
| 8,386,484 | B2 * | 2/2013 | Lessing et al. | 707/736 |
| 8,521,867 | B2 * | 8/2013 | Srinivasan et al. | 709/224 |
| 2001/0049685 | A1 * | 12/2001 | Carey et al. | 707/103 R |
| 2002/0184170 | A1 * | 12/2002 | Gilbert et al. | 706/20 |
| 2003/0172059 | A1 * | 9/2003 | Andrei | 707/3 |
| 2003/0208392 | A1 | 11/2003 | Shekar | |
| 2005/0015439 | A1 * | 1/2005 | Balaji et al. | 709/203 |
| 2005/0050030 | A1 * | 3/2005 | Gudbjartsson et al. | 707/3 |
| 2005/0149552 | A1 * | 7/2005 | Chan et al. | 707/102 |
| 2006/0036935 | A1 * | 2/2006 | Warner et al. | 715/500 |
| 2006/0069702 | A1 * | 3/2006 | Moeller et al. | 707/200 |
| 2006/0085343 | A1 * | 4/2006 | Lisanke et al. | 705/50 |
| 2007/0083860 | A1 | 4/2007 | Bhave | |
| 2007/0118651 | A1 * | 5/2007 | Giampaolo et al. | 709/225 |
| 2008/0082494 | A1 * | 4/2008 | Polo-Malouvier et al. | 707/3 |
| 2008/0104039 | A1 | 5/2008 | Lowson | |
| 2008/0263029 | A1 | 10/2008 | Guha et al. | |
| 2008/0301227 | A1 * | 12/2008 | Clayton | 709/204 |
| 2010/0325124 | A1 * | 12/2010 | Wu et al. | 707/759 |
| 2011/0035369 | A1 * | 2/2011 | Halasipuram et al. | 707/720 |
| 2011/0072008 | A1 * | 3/2011 | Mandal et al. | 707/720 |

FOREIGN PATENT DOCUMENTS

| | | |
|---|---|---|
| JP | 2005280560 | 4/2007 |
| WO | WO 0104802 | 1/2001 |
| WO | WO 02-061613 A3 | 8/2002 |

OTHER PUBLICATIONS

"Open Data Protocol", 1 page.

José Blakeley, et al., "Next-generation Data Access: Making the Conceptual Level Real", Published Date: Jun. 2006, http://msdn.microsoft.com/en-us/library/aa730866%28VS.80%29.aspx, 30 pages.

"Pervasive DataCloud™ 2 User's Guide", Published Date: 2009, http://cloud.pervasive.com/SiteCollectionDocuments/DCEntities.pdf, 12 pages.

Marci Windsheimer, "A Web Service Becomes a Library Service", Published Date: Nov. 6, 2009, http://firstlook.blogs.nytimes.com/2009/11/06/a-web-service-becomes-a-library-service/, 13 pages.

Tim Huckaby, "Implementing Site Server Search Database Catalogs", Published Date: Jun. 9, 2000, http://www.windowsitpro.com/article/tsql3/implementing-site-server-search-database-catalogs.aspx, 12 pages.

"Tutorial: Search performance improvement for Cloudscape", Published Date: Nov. 25, 2009, http://publib.boulder.ibm.com/infocenter/wchelp/v6r0m0/index.jsp?topic=/com.ibm.commerce.samples.doc/tutorial/tussearchperformcloudscape.htm, 7 pages.

"How Custom Search Fields are Stored in the ProductCart Database", Published Date: 2009, http://ip-72-167-158-223.ip.secureserver.net/developers/custom__search__fields__db, pages.

Patent Examination Report No. 1 issued in Australian Patent Application No. 2011224190, Feb. 28, 2014, 3 pages.

Patent Examination Report No. 2 issued in Australian Patent Application No. 2011224190, Apr. 17, 2014, 3 pages.

First Office Action issued in Chinese Patent Application No. 201180013442.4, Jul. 3, 2013, 11 pages.

Second Office Action issued in Chinese Patent Application No. 201180013442.4, Jan. 14, 2014, 13 pages.

Third Office Action issued in Chinese Patent Application No. 201180013442.4, Aug. 1, 2014, 16 pages.

Summary of First Office Action issued in Chinese Patent Application No. 201180013442.4, Jul. 3, 2013, 1 page.

Summary of Third Office Action issued in Chinese Patent Application No. 201180013442.4, Aug. 1, 2014, 3 pages.

International Search Report and Written Opinion dated Nov. 22, 2011 for PCT Application No. PCT/US2011/028133, 9 pages.

Patent Examination Report No. 3 issued in Australian Patent Application No. 2011224190, Oct. 1, 2014, 3 pages.

Fourth Office Action issued in Chinese Patent Application No. 201180013442.4, Jan. 5, 2015, 6 pages.

Office Action issued in Japanese Patent Application No. 2013-500107, Jan. 6, 2015, 4 pages.

* cited by examiner

QUERY MODEL OVER INFORMATION AS A NETWORKED SERVICE

CROSS-REFERENCE TO RELATED APPLICATIONS

This application claims priority to U.S. Provisional Application Ser. No. 61/313,184, filed on Mar. 12, 2010, entitled "QUERY MODEL OVER INFORMATION AS A NETWORKED SERVICE", the entirety of which is incorporated herein by reference.

TECHNICAL FIELD

The subject disclosure relates to flexibly defining different queries over set(s) of data published by publishers to networked storage services for a variety of consumption options.

BACKGROUND

By way of background concerning some conventional systems, computing devices have traditionally executed applications and data services locally to the device. Yet, with the evolution of on-line and cloud services, applications and data services are increasingly being moved to network providers who perform some or all of a given service on behalf of devices. The evolution of network storage farms capable of storing terabytes of data (with potential for petabytes, exabytes, etc. of data in the future) has created an opportunity to mimic the local scenario in a cloud, with separation of the primary device and the external storage.

The separation of the storage of the data from the data owners and publishers, and as further separated from application developers and consumers of the data, however, creates issues that are not present where the data is represented unrestricted on a consumer's local device as in the past—a situation that has concerned content owners due to potential compromise, re-distribution and unrestricted use of the data. However, no cloud service or network storage provider has been able to effectively provide information as a service on any platform, with publishers, developers, and consumers able to easily publish, specialize apps for and consume any kind of data, in a way that can be tracked and audited for all involved and such that publishers can be guaranteed restrictions on their content can be enforced. Moreover, for content owners or publishers who have especially valuable data, the concerns over controlling access to the data becomes even more important. Once relinquishing such valuable data to a networked storage service, questions such as who gains access, what kinds of queries are exposed to the consumers or developers, are difficult to answer without proprietary, custom solutions designed for the particular kind of data.

The above-described deficiencies of today's networked storage services are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In various embodiments, data is published by publishers to an information service configured to receive data sets and allow consumers to consume the data sets via queries. Structural information of the data sets (e.g., column information) is presented to the publishers, at the time of publishing, or later as part of a separate interaction, for the publishers to select which information of the data sets can be a search parameter and which information can be returned in query results.

Query interfaces can then be automatically created based on the selections by the publisher, and the back end databases can be automatically optimized for such query interfaces, e.g., creation of indexes based on the search parameters or query results selected by the publisher. A query aggregator can automatically combine a given query interface with other query interfaces to form more complicated (but still permitted) queries based on the intersection of permissions for the given query interface and the other query interfaces.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

Figure 1:
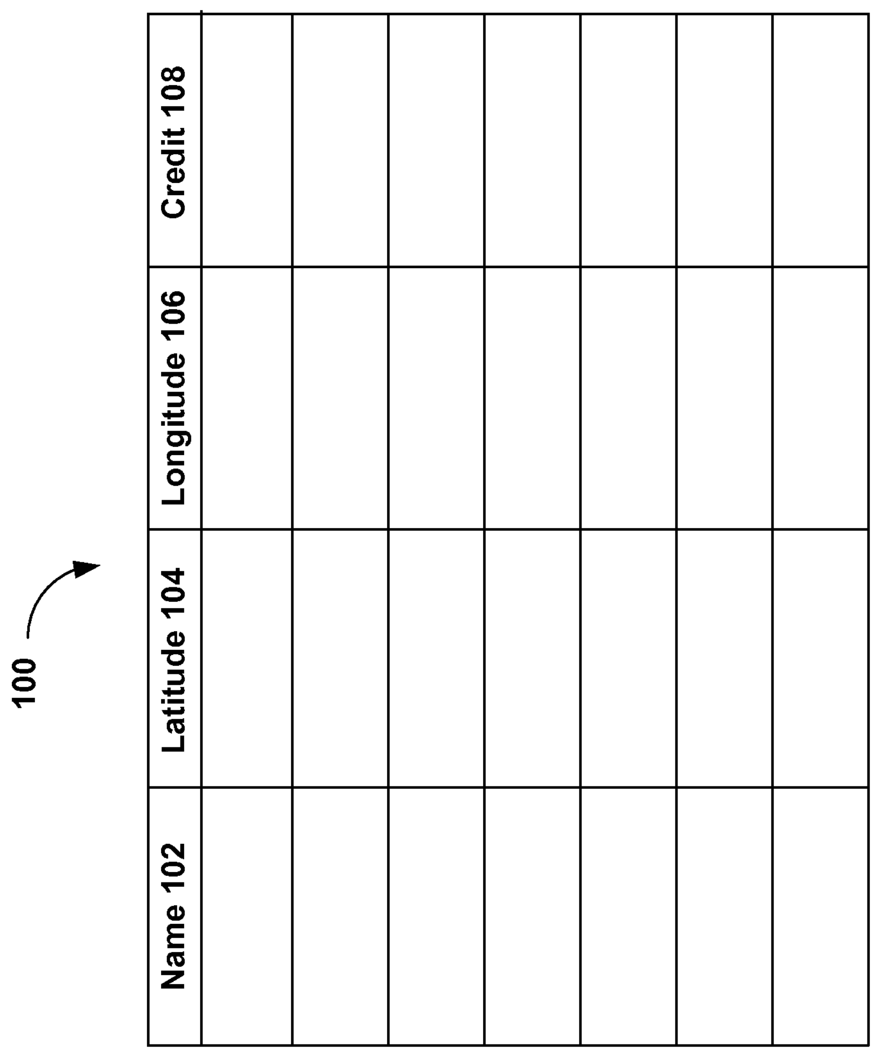
FIG. 1 is a block diagram of an illustrative example of a table, or other structured data, in accordance with an embodiment.
Figure 2:
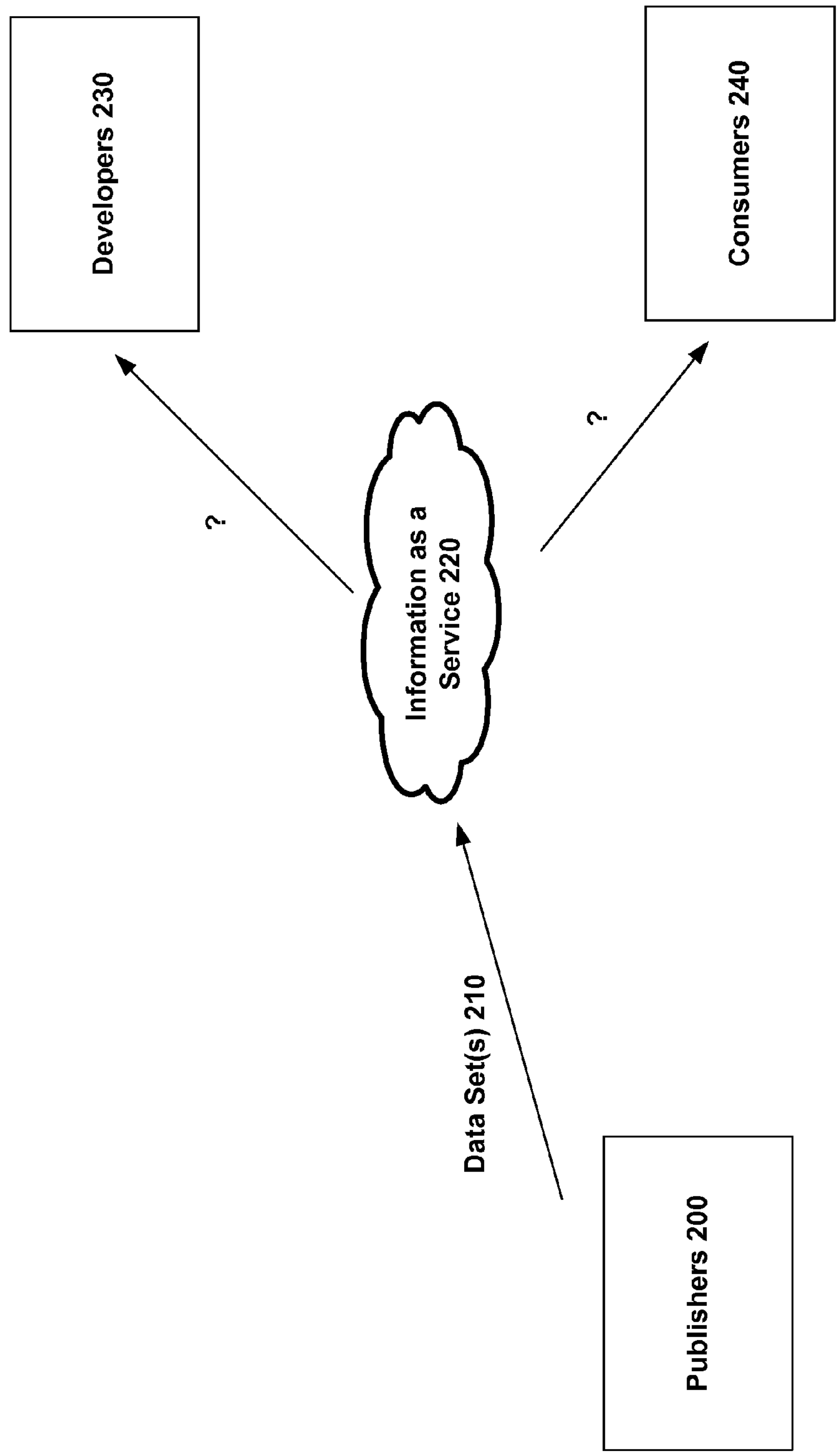
FIG. 2 is a block diagram illustrating one or more limitations of conventional systems addressed by one or more embodiments described herein.

As discussed in the background, for content owners or publishers who have valuable data, concerns over controlling access to the data abound for today's networked storage services. Today, once relinquishing such valuable data to a networked storage service, questions such as who gains access, what kinds of queries are exposed to the consumers or developers, etc. are difficult to answer without proprietary, custom solutions designed for the particular kind of data.

In this regard, for "multi-million" dollar data sets such as Dun and Bradstreet's corporate information, Lexis-Nexis's online case law and news services, etc., there is not a lot of flexibility in terms of giving users access to different stock keeping units (SKUs) for accessing the data or parts of the data by different users or classes of users. For this reason, various subscription models have evolved which effectively either overbill consumers for underuse or under bill heavy consumers.

Accordingly, in various embodiments, publishers easily choose different SKUs for querying over the data published by the publishers, and to automatically have query interfaces, such as application programming interfaces (APIs), generated that correspond to the different SKUs. By controlling what structural information of the data is part of the search parameters, and/or search results, of the query interfaces, the publishers can control what data can be searched, and what results are returned. As one of myriad examples and scenarios this makes possible, an avid Sports reader (consumer) can view and pay for Sports content only of the Newspaper, by the publisher creating a SKU for the Sports content only as part of a result set. Or alternatively, a publisher can control which columns can be searched on for a given data set rather than allowing free and unrestricted reign over access to the underlying data (e.g., preventing reconstruction of a valuable data set piece by piece on a consuming computer by denying searching over or return of results respecting a certain subset of the data). By enabling the creation of different SKUs for querying the data published in the context of information as a service, pricing can be set variably, and rather than constantly changing pricing models, new SKUs can be created or old SKUs deleted in a flexible and straightforward manner. In this regard, SKUs can also be aggregated where similarity of query exists. In addition, based on the search criteria specified by publishers, data can be automatically optimized on the back end for such searching, e.g., creating indices over the search columns implicated by given search query SKUs.

Further details of these and other various exemplary, non-limiting embodiments and scenarios are provided below.

Query Model Over Information as a Networked Service

As mentioned, in the context of information as a service, in various embodiments, a query model is provided for publishers to pick different columns of data to search on to create different search SKUs. For example, for a table that has columns Name, latitude, longitude, Credit, an example of use of one or more embodiments described herein includes automatically creating a query API that takes business Name+Credit as input and returns a latitude and longitude associated with the Name of the business (e.g., Dun+Bradstreet data). The results of such a SKU could be used to create a heat map of creditworthy businesses. An exemplary, non-limiting sequence for achieving this is illustrated in FIGS. 1 to 6.

For instance, as shown in the table of FIG. 1, suppose a publisher wished to publish a valuable data set 100 including columns for business name 102, latitude 104, longitude 106 and credit 106, but nonetheless retain control over how that data can be searched, and which result sets can be returned based on search, in order to maintain control rather than simply relinquishing the data set to the cloud for access by anyone. This problem is illustrated by the block diagram of FIG. 2 wherein publishers 200 wish to publish data set(s) 210 to an infrastructure for providing information as a service 220, but also wish to control the dissemination or search entry points into their data to developers 230 or consumers 240.

Figure 3:
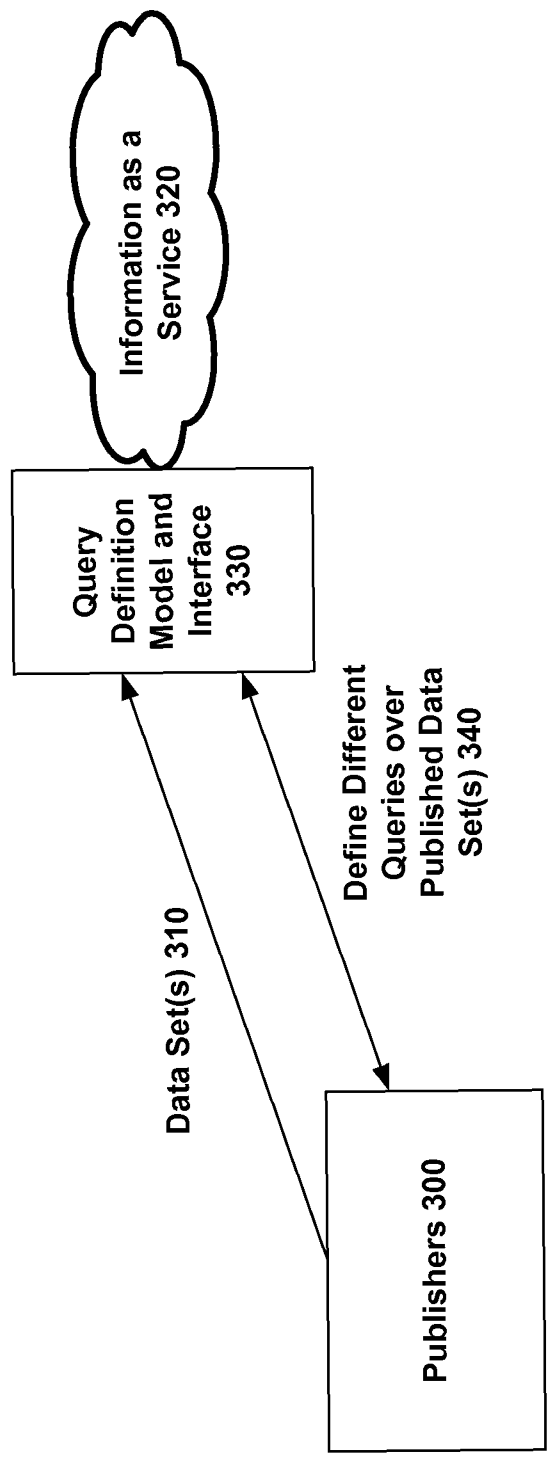
FIG. 3 is a block diagram illustrating a query definitional model and corresponding interface for defining different queries over published data set(s) in accordance with one or more embodiments.

In accordance with various embodiments, as shown in FIG. 3, publishers 300 publishing data set(s) 310 publish to information as a service 320, but then also have access to a query definition model and interface component 330, where by the publisher(s) can define different queries over the published data set(s) via interaction 340.

Figure 4:
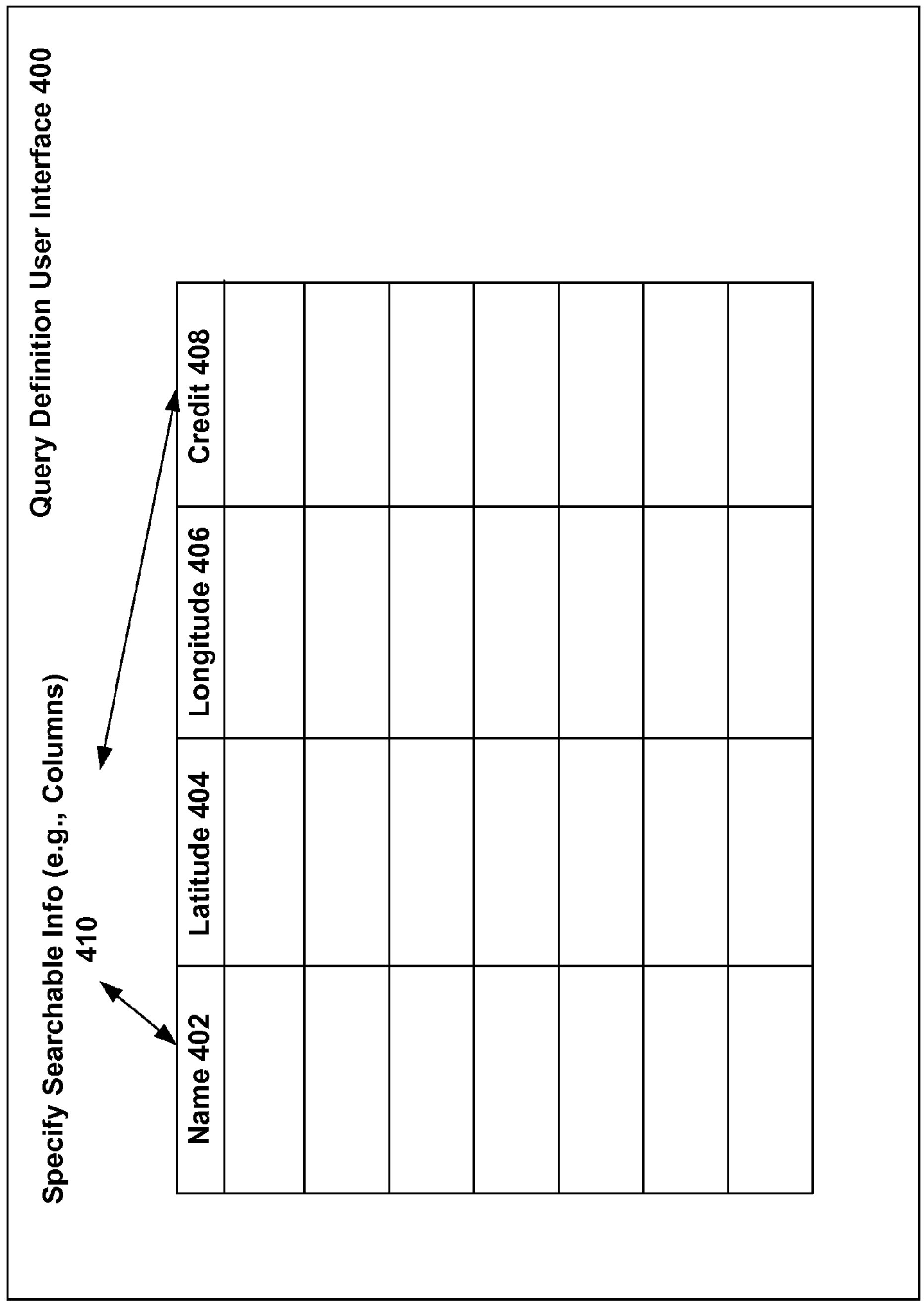
FIGS. 4 and 5 are block diagrams illustrative of the selection of structured information from data set(s) including search predicates, and limitations on results, for use in connection with formation and optimization of queries as described herein for one or more embodiments.
Figure 5:
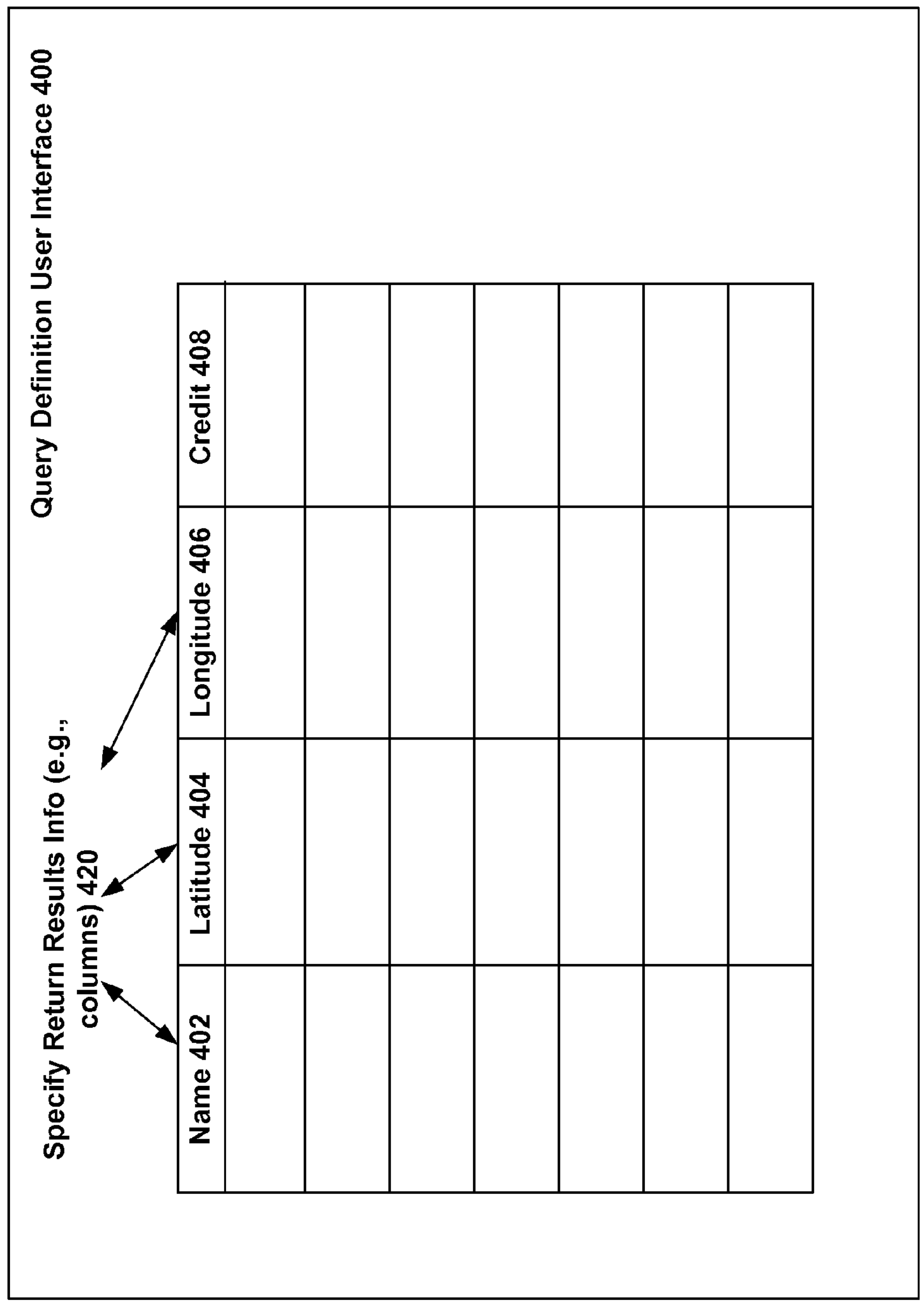

In one embodiment shown in FIG. 4, the information as a service presents a query definition user interface 400 based on an analysis of the published data set(s) to expose various structural bits of information about the data set. For instance, in the present example of a table with name 402, latitude 404, longitude 406 and credit 408, a publisher can select the column names such as name 402 and credit 408, which can be used as part of a search predicate of a query for returning results. Similarly, a publisher can specify return results information 420 via the interface 400 as shown in FIG. 5. For instance, a publisher might specify that name 402, latitude 404 and longitude 406 can be returned as part of query results 420 from a search, but not credit 408 (if all the information could be returned, a user could recreate the table and "cut out" the publisher).

Figure 6:
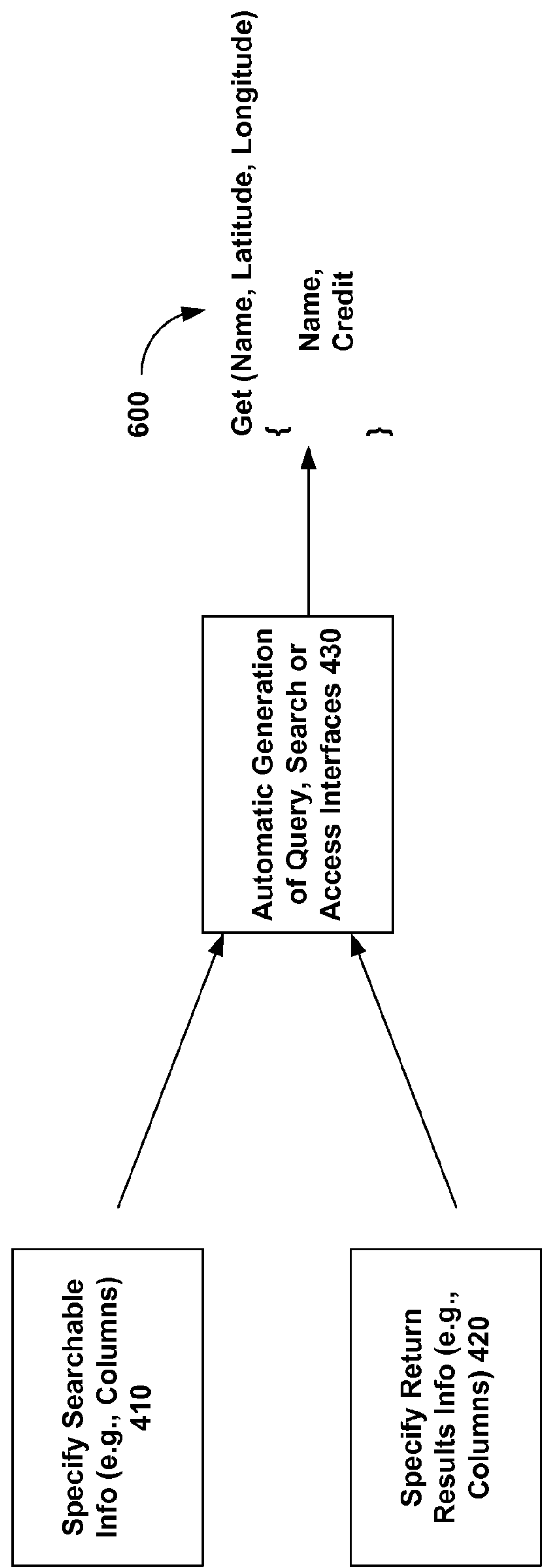
FIG. 6 is a block diagram of the generation of access queries based on specified searchable information and specified return results in accordance with an embodiment.

Then, in accordance with a query generator 430, based on the searchable information 410 specified for a query and based on the query results return information 420, a query API 600 is automatically generated. For instance, in the present example a query API or SKU could be defined as follows as also shown in FIG. 6:

```
Get (Name, latitude, longitude)
{
    Name,
    Credit
}
```

Figure 7:
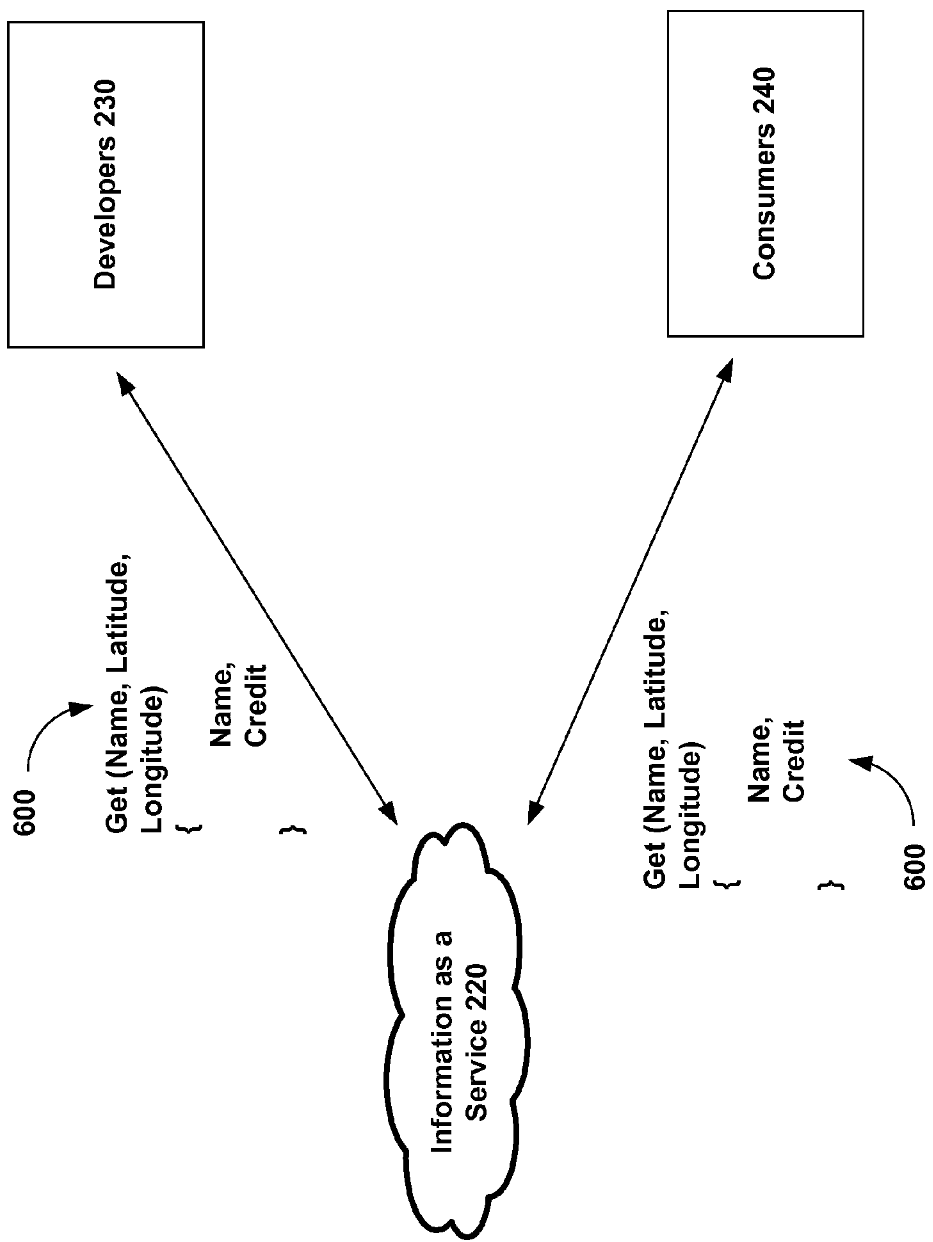
FIG. 7 is a block diagram of the consumption of query APIs as automatically generated in accordance with one or more embodiments.

In this regard, a publisher can define any number of SKUs and define pricing for use of such SKUs accordingly, e.g., consistent with the scope and value of the information being accessed. Pricing can also be made to depend on which entity is searching (e.g., student or non-profit entity v. profit entity). As shown in FIG. 7, API 600 of FIG. 6 is shown as being used by developers 230, on the one hand, and consumers 240. As indicated, different pricing can be implemented for use of the query API 600 based on the auditing and transaction tracking capabilities, e.g., as described in more detail below.

Figure 8:
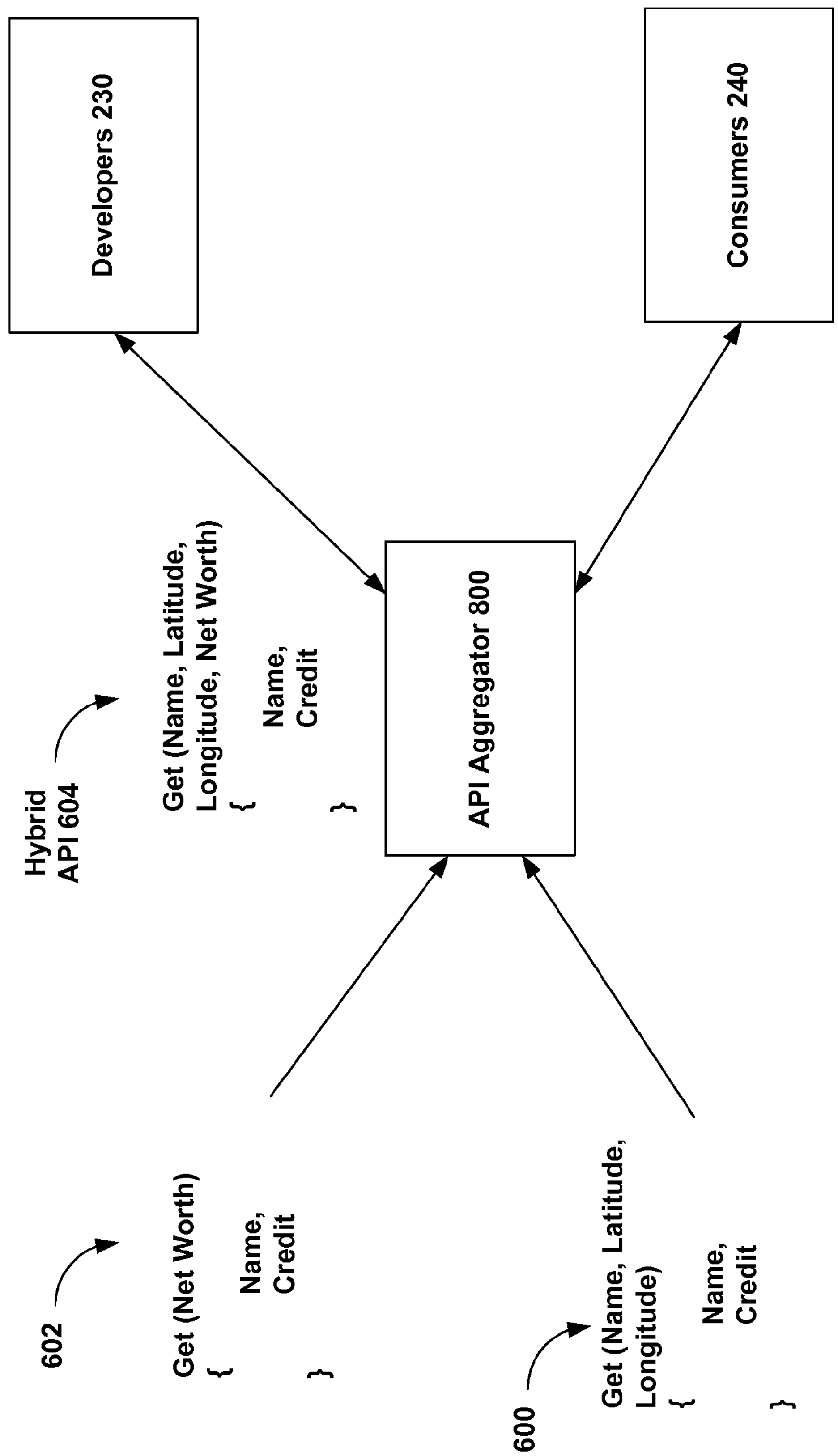
FIG. 8 is a block diagram of the aggregation of APIs or formation of hybrid APIs based on query comparison and/or similarity.

FIG. 8 is a block diagram showing an exemplary, non-limiting embodiment wherein, from the perspective of a consumer of the automatically generated APIs, if the consumer has the ability to use a first query 600, and also has the ability to use a second query 602, if there is some logical overlap between the queries, an API aggregation component 800 can create a hybrid API 604 (for a non-limiting example), and then the hybrid API 604 can be used by the developers 230 or consumers 240. In this sense, as long as the permissions are in place, developers 230 and consumers 240 become empowered to return richer data as part of more complex queries aggregated from individual queries have same or similar structural information, such as columns.

Figure 9:
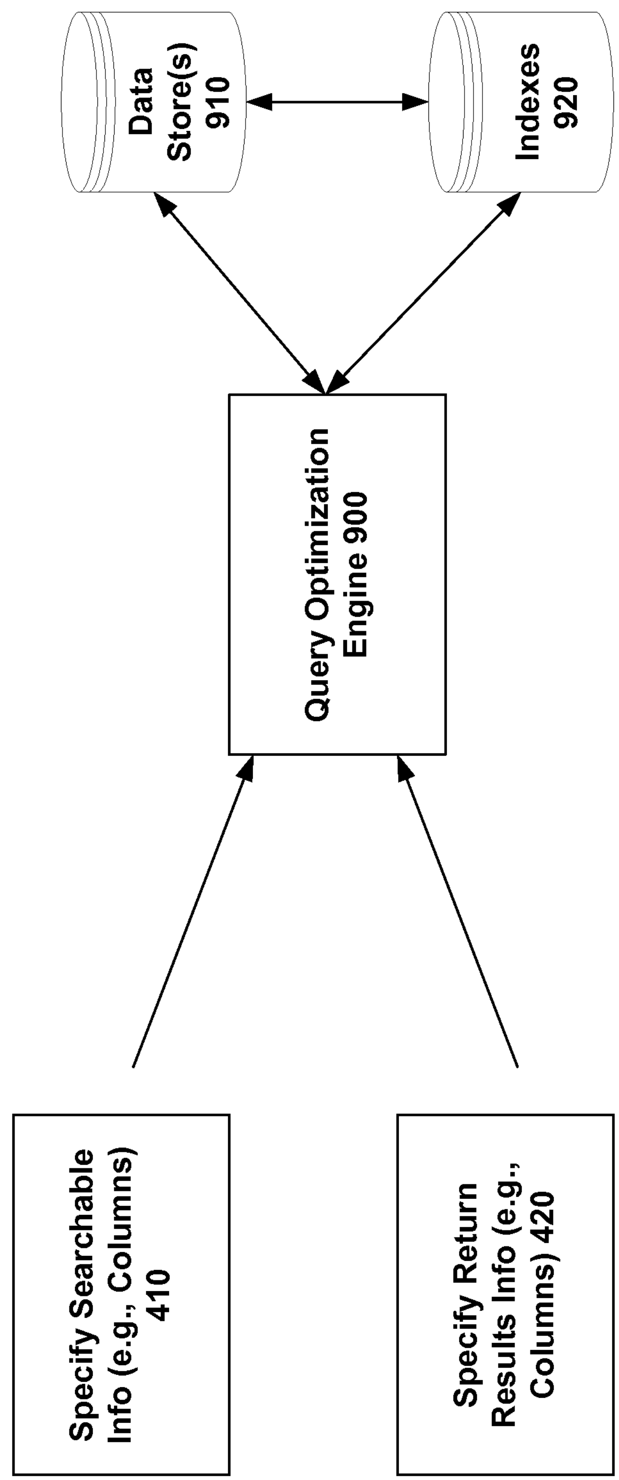
FIG. 9 is a block diagram of the optimization of databases based on specified searchable information and specified return results in accordance with an embodiment.

FIG. 9 illustrates another aspect of the generation of APIs based on the specification of search parameters to be used or search results to be returned. For instance, in the example of FIGS. 4-5 in which searchable information 410 is specified by a publisher and return results 420 are also specified, leading to the creation of query interface 600, similarly, based on parameters 410 and results 420, or query interface 600, a query optimization engine 900 can automatically optimize the underlying storage 910 for the execution of query 600 since it is a known SKU being offered over the data. For instance, indices 920 can be created which speed up the execution of queries, such as query 600, by in effect pre-sorting the data, or by application of other optimization techniques for making queries faster or more efficient. In this sense, the system automatically learns what will be searched, and optimizes a database accordingly, enabling higher performance for associated SKUs and enabling a self-healing storage ecosystem as storage scales over time.

As mentioned, the ability to let publishers easily choose different SKUs for querying over data, and automatically create corresponding APIs that are optimized for the given storage of underlying data enables publishers to flexibly define how data is consumed. For instance, an avid Sports reader who does not normally read the world news need only search for, and pay for Sports content only of the Newspaper, assuming such a SKU is made available. In addition, SKUs can be aggregated and pricing can be set variably based on amount of use of queries, or amount of data returned. In addition, based on the search criteria specified by publishers, data can be automatically optimized on the back end for such searching, e.g., creating indices over the search columns.

In one embodiment, a system for hosting data or connecting to hosted data published by publishers and consumed by consumers via queries includes an information service configured to receive at least one data set published by a publishing device, and a query definition component configured to present structural information associated with at least one subset of data of the at least one data set determined by the information service and configured to receive at least one selection of input from the structural information to define at least one query capability for enforcement over the at least one data set by the information service.

The system can further include a query generator configured to generate a query interface, in response to receiving the at least one selection of the input, for querying over the at least one data set by at least one consuming device. The system can further include a query aggregator configured to combine the query interface with at least one other query interface. The query aggregator can be configured to combine the query interface with the at least one other query interface according to same or similar query definition based on a comparison of the query interface with the at least one other query interface.

The system can further include a query optimizer configured to optimize at least one data store storing the at least one data set, in response to receiving the at least one selection of the input, for optimization of querying over the at least one data set. The query definition component can be configured to present column information of the at least one data set determined by the information service from an analysis of the at least one data set.

Figure 10:
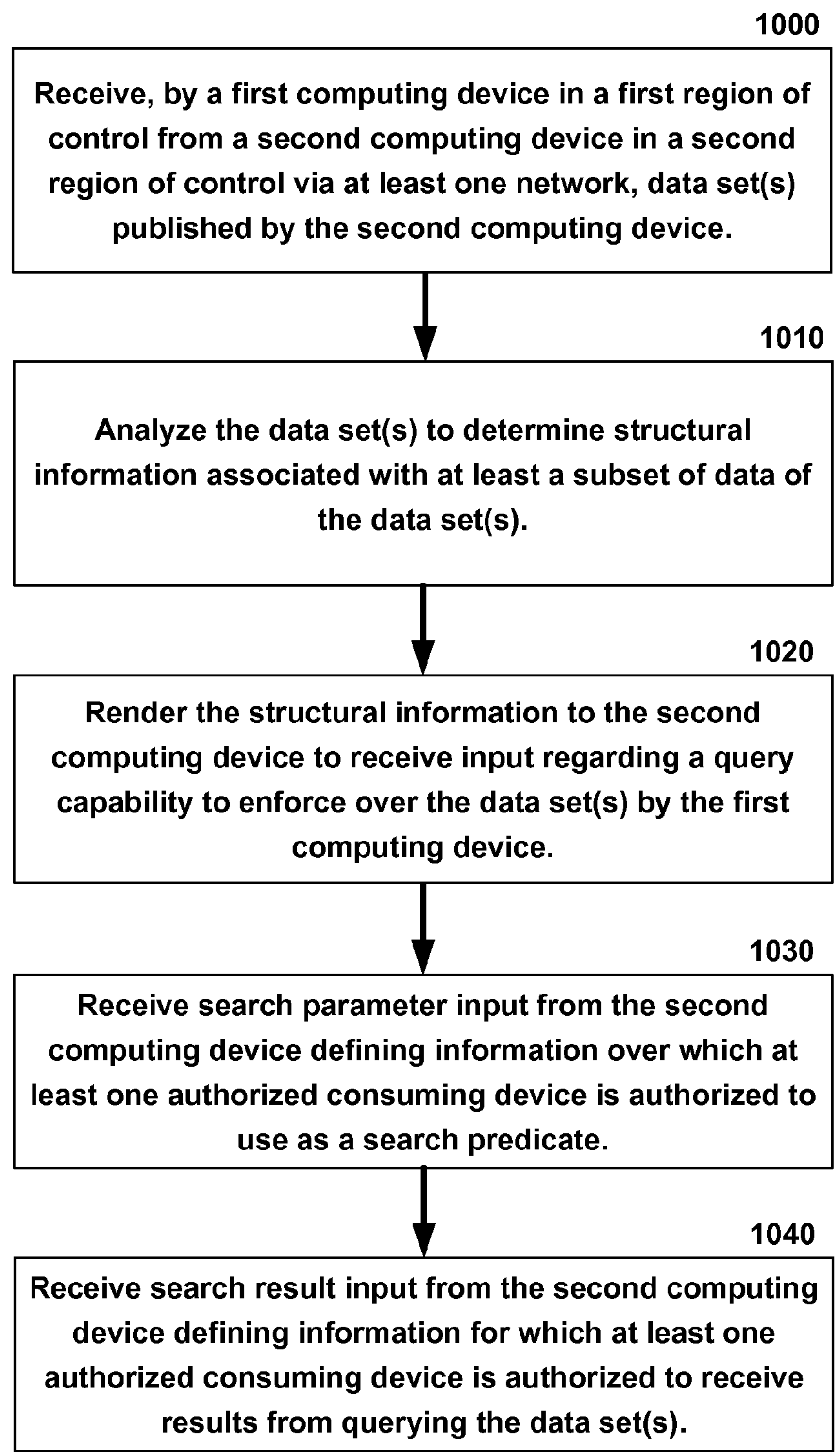
FIG. 10 is a flow diagram illustrating an exemplary sequence for hosting data or connecting to hosted data and automatically creating query interfaces in accordance with a non-limiting infrastructure for information provided as a service from any platform.

FIG. 10 is a flow diagram illustrating an exemplary non-limiting method for hosting data or connecting to hosted data. At 1000, computing device(s) in a first region of control receive, from computing device(s) in a second region of control via at least one network, data set(s) published by the computing device(s) in the second region of control. At 1010, the data set(s) are analyzed to determine structural information (e.g., column information) associated with at least a subset of data of the data set(s). At 1020, the structural information is rendered to the computing device(s) in the second region of control to receive input regarding query capability(ies) to enforce over the data set(s) by the computing device(s) in the first region of control.

At 1030, search parameter input is received from the computing device(s) in the second region of control defining first structural information of the structural information over which at least one authorized consuming device is authorized to search the data set(s). At 1040, search result input is received from the computing device(s) in the second region of control defining second structural information of the structural information for which at least one authorized consuming device is authorized to receive results from the data set(s). The method can be repeated to define any number of arbitrary queries over the data set(s).

A query interface can be automatically generated based on the search parameter input and the search result input for at least one authorized consuming device to use to search the data set(s) according to query constraints defined by the search parameter input and the search result input. In addition, the query interface can be combined with at least one other query interface according to same or similar search parameter input based on comparing the query interface with the at least one other query interface, e.g., according to same or similar search results input based on comparing the query interface with the at least one other query interface.

Figure 11:
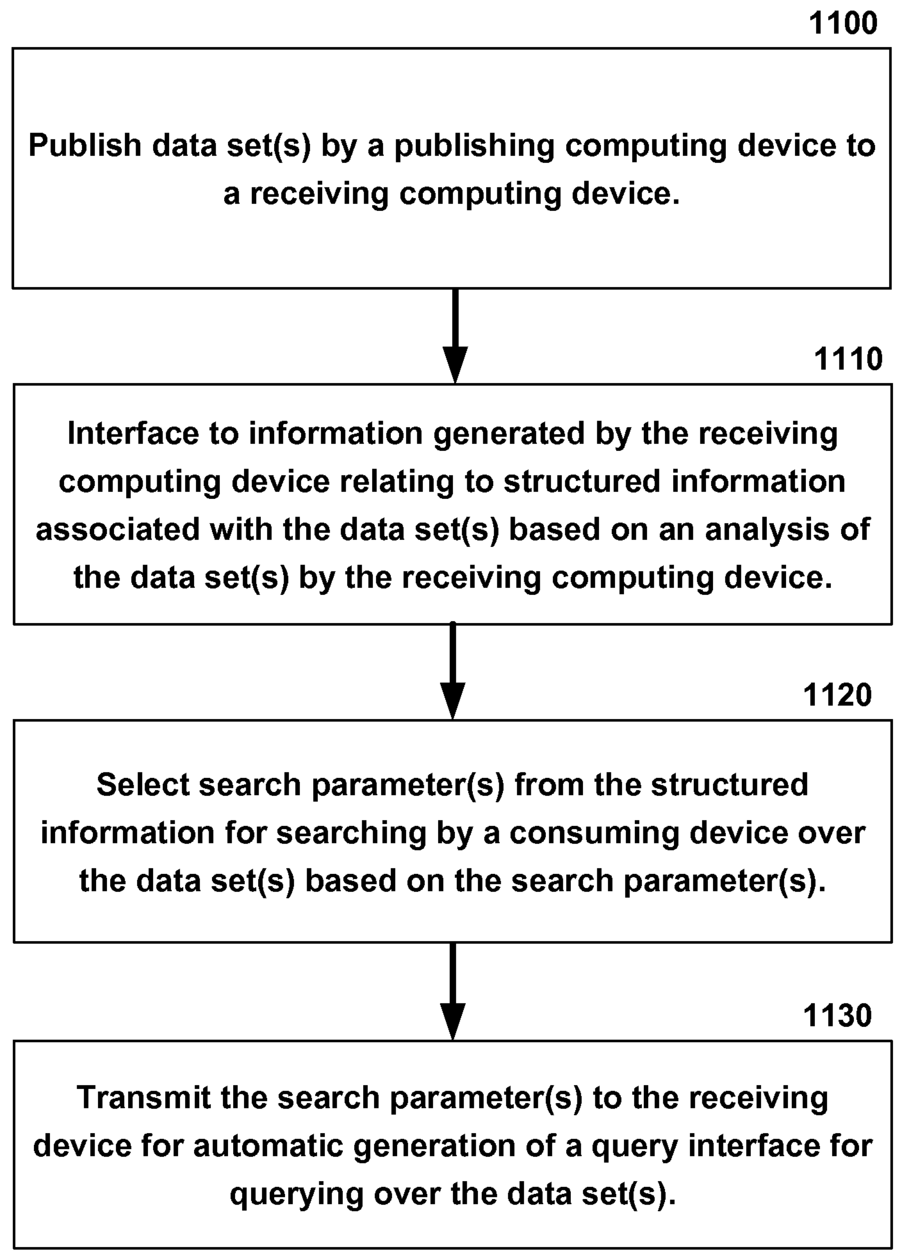
FIG. 11 is a flow diagram illustrating an exemplary sequence for publishing data and specifying search parameter input for queries in connection with a non-limiting infrastructure for information provided as a service from any platform.

FIG. 11 is a flow diagram illustrating an exemplary non-limiting method for publishing data. At 1100, a publishing computing device in a first region of control publishes data set(s) to a receiving computing device in a second region of control. At 1110, the publishing computing device, for example, interfaces to information relating to structured information (e.g., column information) associated with the data set(s) based on an analysis of the data set(s) by the receiving computing device. At 1120, search parameter(s)

can be selected from the structured information for searching by a consuming device over the data set(s) based on the search parameter(s). At 1130, the search parameter(s) can be transmitted to the receiving computing device to automatically generate a query interface for querying over the data set(s).

Figure 12:
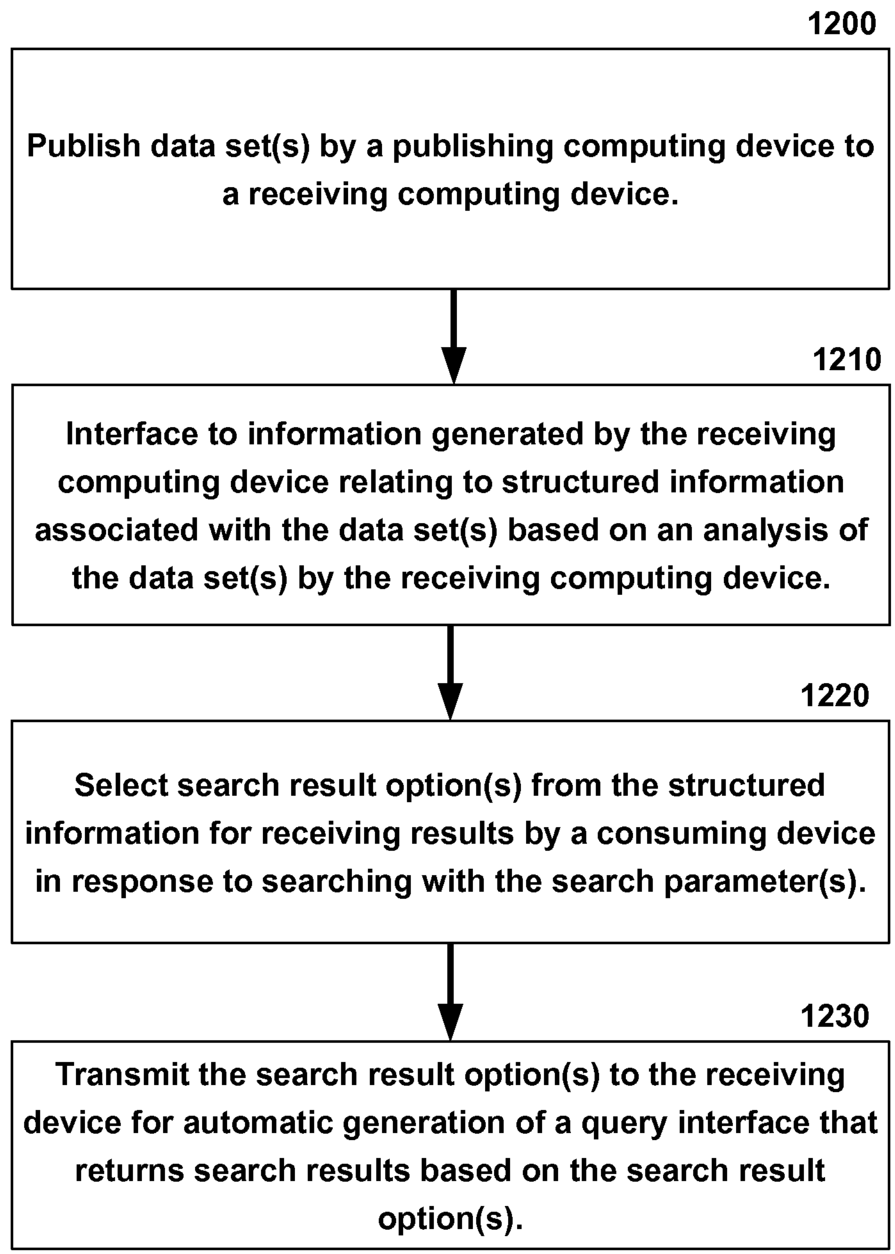
FIG. 12 is a flow diagram illustrating an exemplary sequence for publishing data and specifying search results for queries in connection with a non-limiting infrastructure for information provided as a service from any platform.

FIG. 12 is a flow diagram illustrating an exemplary non-limiting method for publishing data. At 1200, a publishing computing device publishes in a first region of control data set(s) to a receiving computing device in a second region of control. At 1210, the publishing computing device, for example, interfaces to information relating to structured information (e.g., column information) associated with the data set(s) based on an analysis of the data set(s) by the receiving computing device. At 1220, search result option(s) can be selected from the structured information for receiving results by the consuming device in response to the searching with the search parameter(s). At 1230, the search result option(s) can be transmitted to the receiving computing device to automatically generate a query interface for querying over the data set(s).

Figure 13:
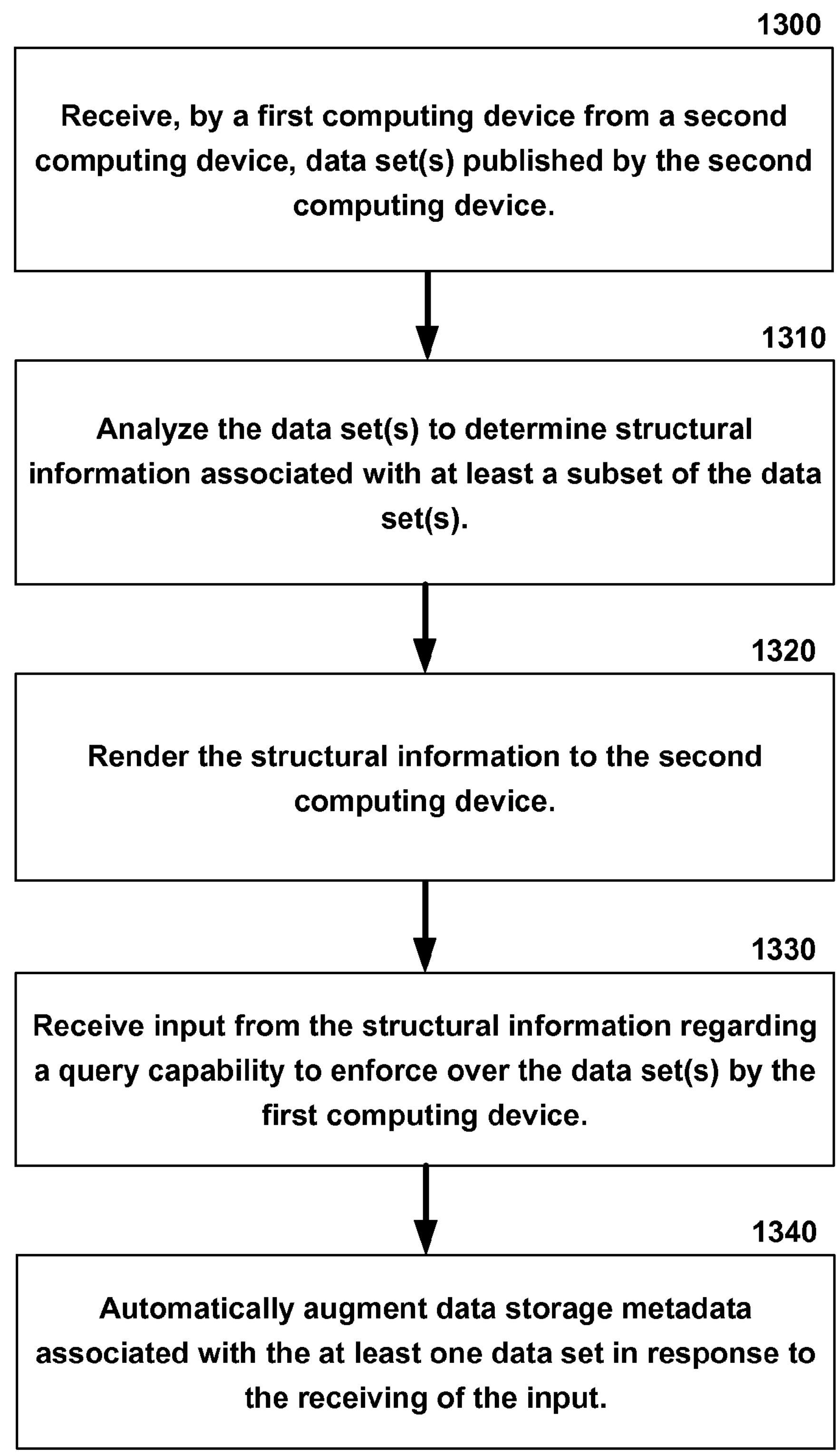
FIG. 13 is a flow diagram illustrating an exemplary sequence for optimizing a data store based on queries generated according to one or more non-limiting embodiments of a infrastructure for information provided as a service from any platform.

FIG. 13 is a flow diagram illustrating an exemplary non-limiting method for hosting data or connecting to hosted data. At 1300, computing device(s) in a first region of control receive data set(s), from computing device(s) in a second region of control via at least one network, published by the computing device(s) in the second region of control. At 1310, the data set(s) are analyzed to determine structural information associated with at least one subset of data of the data set(s). At 1320, the structural information (e.g., column information) is rendered to the computing device(s) in the second region of control. At 1330, input is made from the structural information regarding at least one query capability to enforce over the data set(s) is received by the computing device(s) in the first region of control. At 1340, data storage metadata associated with the data set(s) is automatically augmented in response to the receiving of the input to optimize execution of the queries over the data set(s). For instance, the augmenting of the data storage metadata can include generating or augmenting index information associated with the data set(s) based on the input from the structural information.

Figure 14:
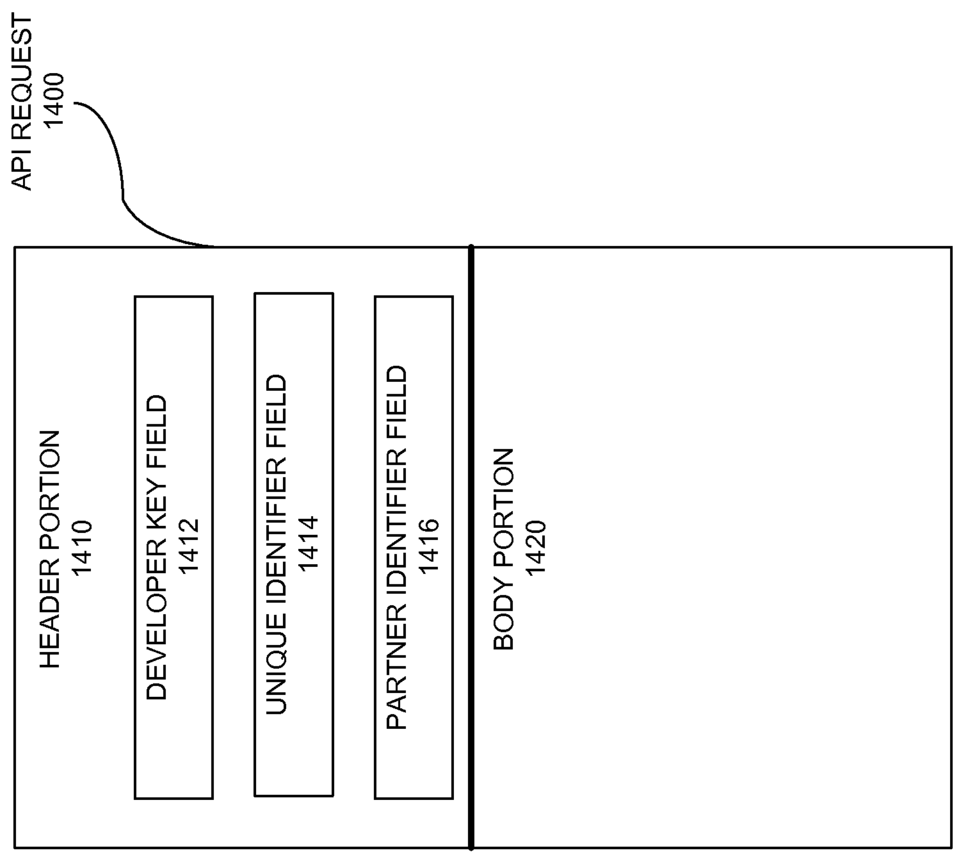
FIG. 14 is a block diagram illustrating an exemplary non-limiting aspect of metadata, including partner identifier metadata, tracked by a non-limiting infrastructure for information provided as a service from any platform.

Referring next to FIG. 14, an exemplary API request over published data set(s) is illustrated according to an embodiment. As shown, API request 1400 may include a header portion 1410 and a body portion 1420. In an aspect, header portion 1410 can include a developer key field 1412, a unique identifier field 1414, and a partner identifier field 1416. For this embodiment, it can be appreciated that unique identifier field 1414 may facilitate tracking multi-seat API usage by including a unique identifier for multiple users. Furthermore, with respect to partner identifier 1416, it can be appreciated that a null value can be specified indicating that no partner is affiliated with a particular API request.

In this regard, as described with respect to FIG. 13 above, various data storage metadata can be stored and automatically updated as part of the publishing of data set(s) to optimize the execution of queries. In addition, at publishing time, the metadata associated with the data set(s) can be automatically updated to include a partner identifier field 1414, which can be used to match with queries respecting a given partner identifier applying to a given partner for purposes of tracking access to, auditing, etc. usage of the given partner's data set(s). In this way, if multiple partner's data set(s) are consumed by an API request from a developer, consumer, subscriber, etc., all partner's can be given credit for applicable data access.

In additional embodiments, a method for publishing data can comprise publishing, by publishing computing device(s) in a first region of control to receiving computing device(s) in a second region of control, data set(s) and interfacing to an interface, generated by the receiving computing device(s) in the second region of control, including information relating to structured information associated with the data set(s) based on an analysis of the data set(s) by the receiving computing device(s). The method can further include selecting search result option(s) from the structured information for receiving results by the consuming device(s) in response to the searching with search parameter(s). The interfacing can include interfacing to the interface including information relating to columns associated with the data set(s).

The method can include transmitting the search result option(s) to the receiving device(s) for automatic generation of a query interface that returns search results based on the search result option(s). The method can include selecting the search parameter(s) from the structured information for searching by consuming device(s) over the data set(s) based on the search parameter(s). The method can include transmitting the search parameter(s) to the receiving device(s) for automatic generation of a query interface for querying over the data set(s).

In other embodiments, a method for hosting data or connecting to hosted data can include receiving, by computing device(s) in a first region of control from computing device(s) in a second region of control via network(s), data set(s) published by the computing device(s) in the second region of control and analyzing the data set(s) to determine structural information associated with subset(s) of data of the data set(s). The method can include rendering the structural information to the computing device(s) in the second region of control, receiving input from the structural information regarding query capability(ies) to enforce over the data set(s) by the computing device(s) in the first region of control; and in response to the receiving of the input, automatically augmenting data storage metadata associated with the data set(s).

The augmenting can include generating or augmenting index information associated with the data set(s) based on the input from the structural information. The augmenting can also include updating the data storage metadata to include partner identifier(s) associated with the data set(s). The analyzing can include determining column information associated with the data set(s).

Supplemental Context for Information as a Service

The following description contains supplemental context regarding potential non-limiting infrastructure, architectures and/or associated services to further aid in understanding one or more of the above embodiments. Any one or more of any additional features described in this section can be accommodated in any one or more of the embodiments described above with respect to flexibly defining different queries over set(s) of data published by publishers to networked storage services for a variety of consumption options. While such combinations of embodiments or features are possible, for the avoidance of doubt, no embodiments set forth in the subject disclosure are to be considered limiting on any other embodiments described herein.

By way of some additional background, today, while information can be obtained over networks, such as the Internet, today's offerings tend to the proprietary in terms of access and framework, and are thus limited in terms of third party provider participation. For instance, currently, there is no adequate business model for commercial content providers to publish their data in a way that does not relinquish at least some of the value of such commercial content, and thus historically, owners of valuable content have tended to expose that content through limited proprietary means. Or, in instances where storage of such content is provided by secure cloud storage providers, there is little value in storage alone when a consumer must wade through thousands of tables to potentially find an item of interest. In addition, even where cloud storage providers attempt to collect data from various providers, at best such providers can boast a modest, small or incomplete catalog of data.

Much of the stunting of potential growth in this area has been the result of mistrust over handling and IP (e.g., copyrights). In short, big players don't trust cloud providers with crown jewels because a single compromise can end the value of the data. In addition, such cloud providers to date have had a weak position with respect to information workers who wish to extract value from such data for their informational needs, and in addition, due to the proprietary nature of such systems, developers have thus far had limited ability to expand tools for developing informational capabilities.

Accordingly, as described for one or more embodiments, an infrastructure for information as a service is provided that accommodates all classes of individuals: publishers, developers, information workers, and consumers. The infrastructure enables information discovery, e.g., the ability to discover, acquire, and consume structured and blob datasets to power any application—on any platform and any form factor (e.g., any screen size). The infrastructure further enables brokerage business, e.g., a partner driven ecosystem and global reach to deliver data and functionality to developers and information workers. The infrastructure also allows analytics and reporting, e.g., a single click analysis to augment private data with public data. In this regard, due to the open nature of various implementations of the infrastructure, any application developer can develop mobile, cloud, and/or desktop applications to facilitate the publishing, processing, querying and/or retrieval of data.

To write applications, one can register for account information (e.g., sign in with Live ID) and be provided with an account key by which to access the "blob" via structured and real-time web services enabled for the infrastructure for information as a service as described for one or more embodiments herein. In one aspect, developers can explore the APIs visually before coding begins. For instance, a service explorer module or set of modules can be used by developers to visually construct representational state transfer (REST) API queries and preview the content according to a variety of packages, such as, but not limited to extensible markup language (XML), ATOM, RAW (for blob and real-time content), or in a table view (e.g., for structured data). For example, a developer merely provides his or her account key and selects to preview the content.

Accordingly, developers can build mobile, desktop or service applications on any platform. While resulting REST queries can be copied into a new developer application, the infrastructure for information as a service also enables the ability to consume automatically generated C# proxy classes to eliminate any need to create a local object model or generate and understand the details of XML or web service code. In this regard, in another non-limiting beneficial aspect, a developer can download the proxy classes and include them in the developer's applications to consume service data with as few as a couple lines of code.

In this regard, the various embodiments of an infrastructure for information as a service allow developers and information workers to find, acquire, and consume data in their applications and analytics scenarios instantly, periodically, or over some other function of time specified by the application developer. As mentioned, a developer obtains an account key which then accompanies web services calls to the network services enabling information as a service as described for one or more embodiments herein for content requests and subscribing to the content of interest.

Thus, in one aspect, the account key provided by the infrastructure for information as a service as described for one or more embodiments herein is the developer's private key. This key enables billing and reporting on content used in connection with the developer's applications. As such, this private developer key is not to be shared without purpose, and precautions in securing the key can be taken where developing native applications running on mobile or desktop solutions and planning to integrate the key as part of the deployment. For example, cryptographic storage can be used to ensure the key is not cracked.

In addition to the account key, which is used to track the application consuming the content, the unique user ID is a globally unique identifier (GUID) that represents the developer's individual users. This field allows billing for content that is priced on a per-user basis programmatically. For example, if a developer is developing a mobile application with an individual user consuming the application, the developer can return the same GUID each time requests are made on behalf of that individual user. However, if the developer is developing a web portal and issuing web service requests on behalf of a variety of users, it is up to the developer to assign a new GUID for each unique user visiting the portal. For example, each registered user can be assigned a GUID or each IP address/port combination assigned a unique user ID GUID, etc.

While REST APIs can be constructed on any platform to consume content from the infrastructure for information as a service as described for one or more embodiments herein, in one embodiment, proxy classes can be dynamically generated for services in C#. Achieving this is a matter of downloading the object models, adding them to the current developer project, and updating the account and unique user values.

If a developer would like to issue requests manually, an example is provided below, but for any service, the preview function can be used, or the URLs created from the Service Explorer can be invoked as well. An exemplary, non-limiting REST query to a sample dataset is illustrated below. It is noted that some or all calls can be secure socket layer (SSL) secured.

https://api.sqlazureservices.com/UnService.svc/UNESCO(120)

The $accountKey and $uniqueUserId elements are also placed in the header of the request, which appears as follows, for example:

$accountKey={developer acccount key}

$uniqueUserID={a GUID representing the unique user}

The value in $accountKey represents the developer's account key, found in the Accounts Tab and the value in $uniqueUserID represents the GUID for the unique user accessing the service.

Accordingly, the infrastructure for information as a service as described for one or more embodiments herein is a new service or framework allowing developers and information workers to easily discover, purchase, and manage premium data subscriptions in any platform. The infrastructure is an information marketplace that brings data, imagery, and real-time web services from leading commercial data providers and authoritative public data sources, as well as non-authoritative publishers, together into a single or multiple locations that are unified under a common provisioning and billing framework. Additionally, developers and information workers can consume this premium content with virtually any platform, application or business workflow.

Some exemplary, non-limiting scenarios for using the infrastructure for information as a service as described for one or more embodiments herein include: (a) finding premium content to next-generation "killer apps" for consumer and business scenarios, (b) discovering and licensing valuable data to improve existing applications or reports, (c) bringing disparate data sets together in innovative ways to gain new insight into business performance and processes, e.g., aggregation algorithms, (d) instantly and visually exploring APIs across all content providers for blob, structured, and real-time web services and (e) consuming third party data inside existing applications and data base systems, such as existing word processing, spreadsheet, database query systems, etc., for rich reporting and analytics.

Benefits for developers include: (a) trial subscriptions allow content to be investigated and applications to be developed without paying data royalties, (b) simple transaction and subscription models allow "pay as you go or grow" access to multi-million dollar datasets, (c) consistent REST based APIs across datasets facilitate development on any platform, (d) visually building and exploring APIs, previewing results and (e) automatic C# proxy classes provide instant object models and eliminate the need to write tedious XML and web service code.

Benefits for Information Workers include: (a) integration with PowerPivot to easily work with data in existing spreadsheet software such as, but not limited to, Excel, (b) simple, predictable licensing models for acquiring content and (c) the ability to consume data from SQL Server, SQL Azure Database, and other pre-existing assets.

Benefits for Content Partners include: (a) easy publication and on-boarding process regardless of blob data, structured data, or dynamic web services, (b) developer tooling on the selected platform to ease development, e.g., via Visual Studio and .NET or other runtime system development, (c) exposing developer content to global developer and information worker community, (d) content discovery and integration inside pre-existing content consumption applications and (e) a scalable cloud computing platform handles storage, delivery, billing, and reporting on behalf of all parties.

In a non-limiting implementation of the infrastructure for information as a service as described for one or more embodiments herein, some features for Rich Web Services include: (a) secure, REST based model for consuming services across the entire content catalog, (b) dynamic pagination built into the APIs to simplify access, (c) Standard ATOM 1.0 feeds are available for most of the services and (d) consistent billing, provisioning, and usage reporting across all services.

In a non-limiting implementation of the infrastructure for information as a service as described for one or more embodiments herein, some features for a Service Explorer component include: (a) C# proxy classes generated to simplify development, (b) preview of data in tabular form and as a feed, such as an ATOM 1.0 feed, if supported, (c) invocation of the service to understand the results that the compiled service call returns, (d) discovery of documentation and sample values for each of the parameters and (e) instant copying of the visually built URL for a service call into clipboard to ease development.

In a non-limiting implementation of the infrastructure for information as a service as described for one or more embodiments herein, some features for a Marketplace Integration and Discovery Portal component include: (a) discovery of new data across domains including consumers and businesses, (b) management of service subscriptions and usage limits, (c) management of account keys to access the services and (d) detailed access reporting containing the services/datasets that were accessed, grouped by date and by account key.

The infrastructure provides a variety of value propositions for content owners, application developers/ISVs and for information workers and other consumers/subscribers. For content owners, the infrastructure enables monetization from data (for data providers who charge for the data), in addition to social benefits for data providers who do not charge for data, but derive benefit from the publication of such data in other ways. Due to the openness of the infrastructure, content owners enjoy greater availability and reach of data to ISVs and consumers/information workers, and all of this comes at a lower cost, particularly over developing a proprietary model as in the past.

For application developers/ISVs, the infrastructure enables access to data in a consistent format, variable and low-cost pricing model for data access. predictable pricing, profit potential from consumers/IWs using the applications built using the data, broader reach to consumers through any platform and a single billing and data source For information workers/consumers, the infrastructure enables added value from applications, consumption of data in current large object (LOB) or IW software, a variable and low-cost pricing model for data access in addition to a single billing and data source.

Accordingly, the infrastructure solves a current customer and developer pain point with a potentially significant revenue upside, creates unique business intelligence opportunities attached with instant data for modeling, reporting, analysis and trending and creates adoption and stickiness for any platform by encouraging data owners to store their data via the infrastructure, thereby differentiating the infrastructure's value proposition when compared with conventional cloud storage environments.

Figure 15:
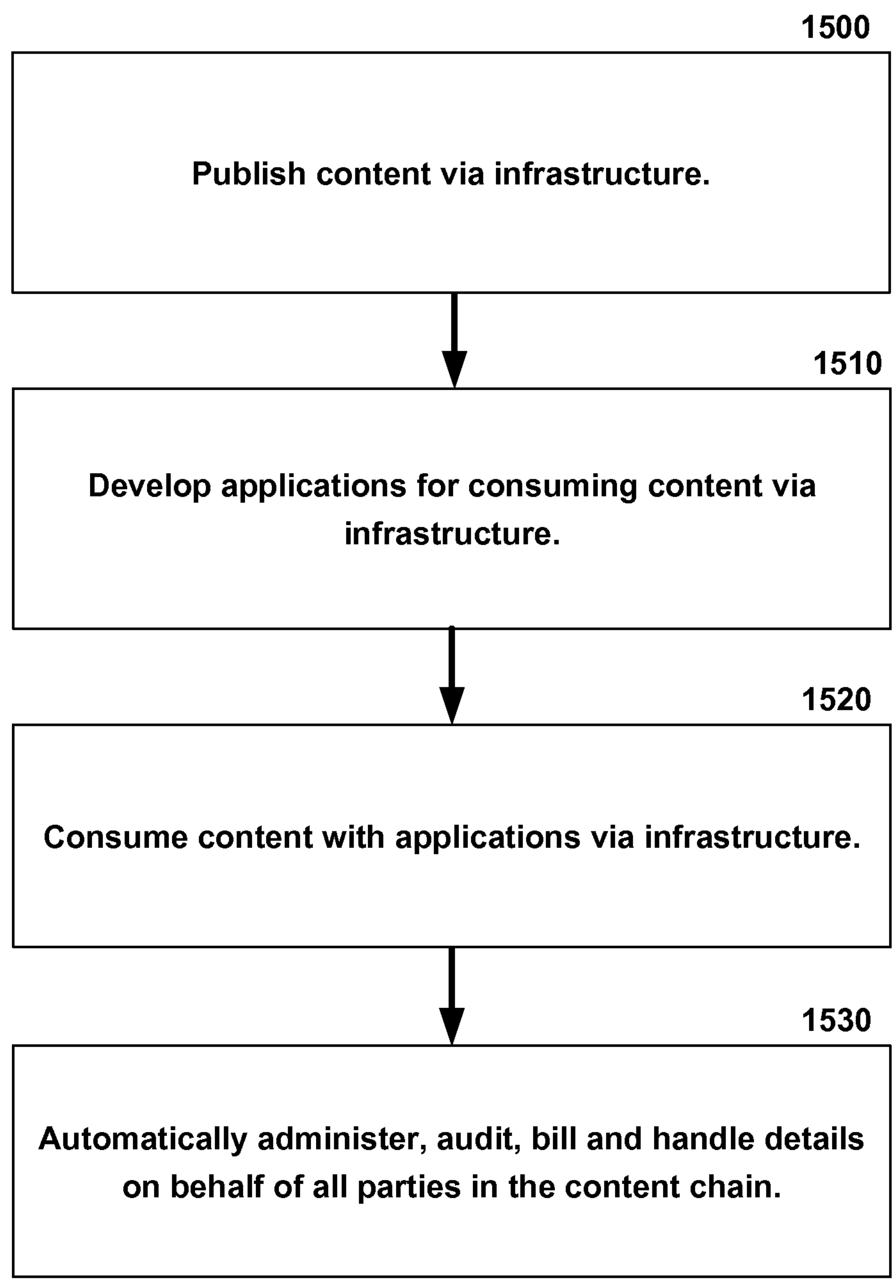
FIG. 15 is a flow diagram illustrating an exemplary sequence for a non-limiting infrastructure for information provided as a service from any platform.

As shown in the flow diagram of FIG. 15, at 1500, described herein are various ways for content owners or publishers to publish data via the infrastructure. At 1510, there are a variety of tools that allow developers to developer applications for consuming the data via the infrastructure. At 1520, consumers or information workers use the applications or can directly query over the data to consume the data. Lastly, the infrastructure provides a rich variety of tools at 1530 that enable automatic administration, auditing, billing, etc. on behalf of all parties in the content chain, enabled by the transaction model.

In this regard, some key parties in the infrastructure include data owners, the application developers/ISVs and the consumers/information workers. In general, data owners are entities who want to charge for data, or who want to provide data for free for other reasons, or enforce other conditions over the data. In turn, application developers/ISVs are entities who want to monetize their application (e.g., through advertising, direct payments, indirect payments, etc.), or provide their application for free for some beneficial reason to such entities. Information workers and consumers are those who can use the raw data, or those who want to use an application provided by the application developers.

Figure 16:
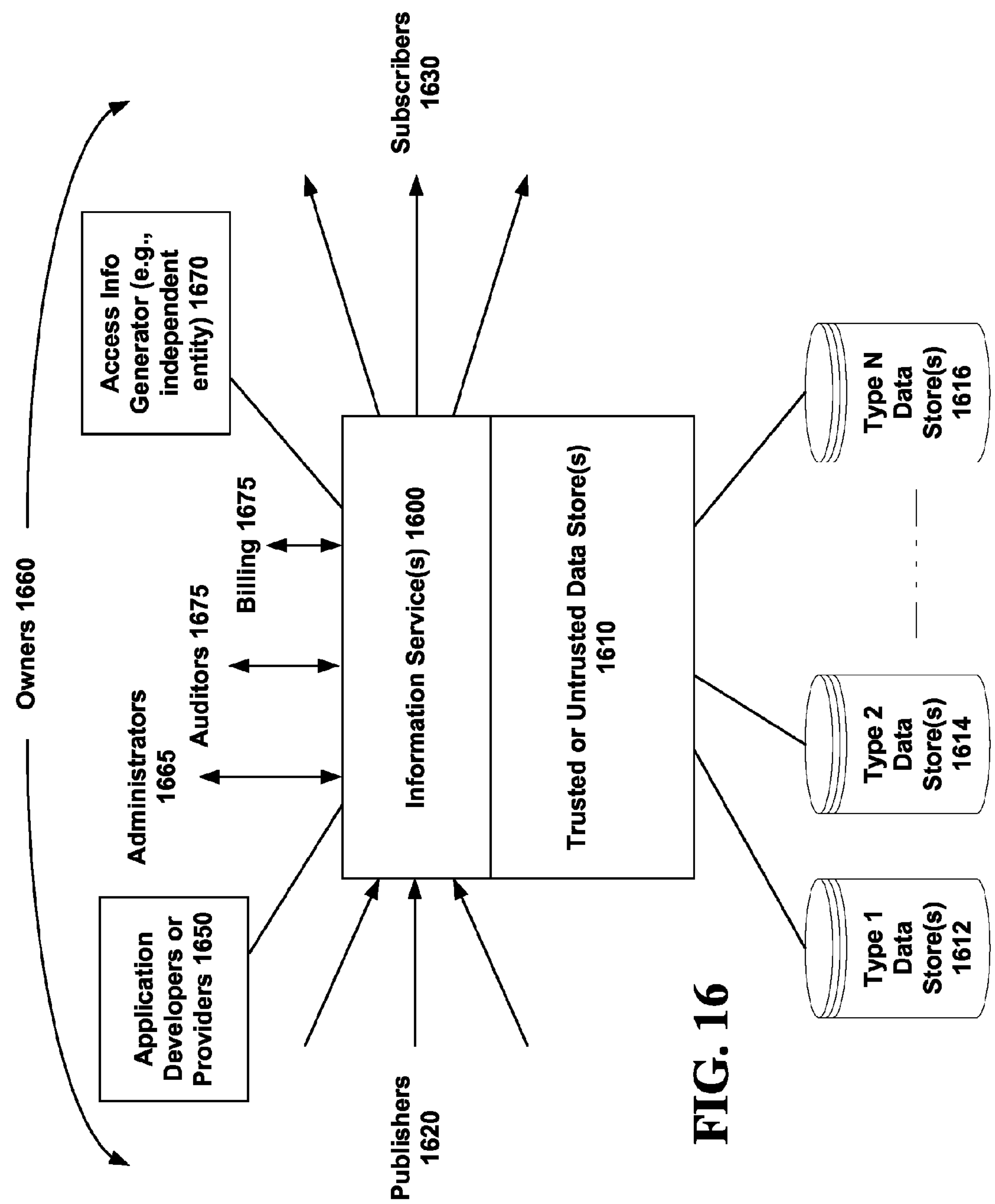
FIG. 16 is a block diagram illustrating an exemplary non-limiting infrastructure for information provided as a service from any platform.

FIG. 16 is a block diagram generally illustrating the various parties that may participate in an ecosystem providing information as a service as described herein. For instance a set of network accessible information services 1600 provide access to a variety of trusted or untrusted data stores 1610, depending on the sensitivity or other characteristics of the data. As shown, thus, what type of data store, 1612, 1614, . . . , 1616 is not so important since the ecosystem supports any kind of data, blob, structured, unstructured, etc. As mentioned, the system includes publishers 1620 that add data to the ecosystem, subscribers 1630 that consume the data and application developers or providers 1650 who help consumption of the data with their applications. An access information generator 1670 can also govern access to the data by various parties through maintaining or enforcing account information, key information, etc. In this respect, content owners 1660 can span any of the roles in that a content owner 1660 can be a publisher 1620, a subscriber 1630 and/or an application developer as well. In one aspect, the common infrastructure for all parties enables administration 1665, auditing 1675, billing 1675 as well as other desired ancillary services to the data transactions occurring across the infrastructure.

In this regard, various embodiments for the user friendly data platform for enabling information as a service from any platform is an infrastructure to enable consumers of data (IWs, developers, ISVs) and consumers of data to transact in a simple, cost effective and convenient manner. The infrastructure democratizes premium (private) and community (public) data in an affordable way to allow IWs to draw insights rapidly, allows developers to build innovative apps using multiple sources of data in a creative manner and enables developers to monetize their efforts on any platform. For instance, the infrastructure supports Pay Per Use as well as Subscription Pricing for Content, Pay for Content ("retail price"—set by content owner), Pay Data Fee ("Shipping and Handling") and BW, and further supports Data fees as a brokerage fee on a per-logical transaction basis (per report, per API, per download, etc.).

For Information Workers (e.g., Office, SQL Server, Dynamics users), the infrastructure supports subscriptions to allow for future EA integration as well as predictable spend characteristics (as well as caching to support on and off-premise BI as well as "HPC" workloads). Thus, alternatives include content priced per-user per-month; which may or may not bundle to deliver content packs or per-transaction pricing, e.g., allowing cloud reporting/business intelligence on-demand pricing to eliminate the need to move large amounts of data while allowing per-usage pricing, or vertical apps via report galleries.

For content providers (any data type; any cloud), using any platform, the infrastructure becomes a value proposition to incent sales within any particular desired platform; auto-scaling, higher level SLA possibilities at no additional cost. For some non-limiting examples, data can be secure and associated data in the following domains: Location aware services & data, Commercial and residential real estate, Financial data and services, etc. A non-limiting scenario may include delivery of data to top 30 non-governmental organization (NGO) datasets. In addition, the infrastructure may include the ability to showcase BI & visualization through "Bing for information as a service", HPC, etc. Vertical application opportunities exist as well.

In one non-limiting embodiment, the data brokerage can be analogized to conventional brick and mortar strategies: For instance, capacity can be represented as shelf space (e.g., a mix of structured and unstructured/blob data), cost of goods (COGS) can be represented as square footage, (SA, platform dependency, bandwidth) and content can be represented as merchandise (e.g., optimize content providers to cover COGS, maximize profits from IWs and developers). In various embodiments, an onboarding process can be implemented with quality bars for data and services, as well as accommodation of service level agreements (SLAs).

Figure 17:
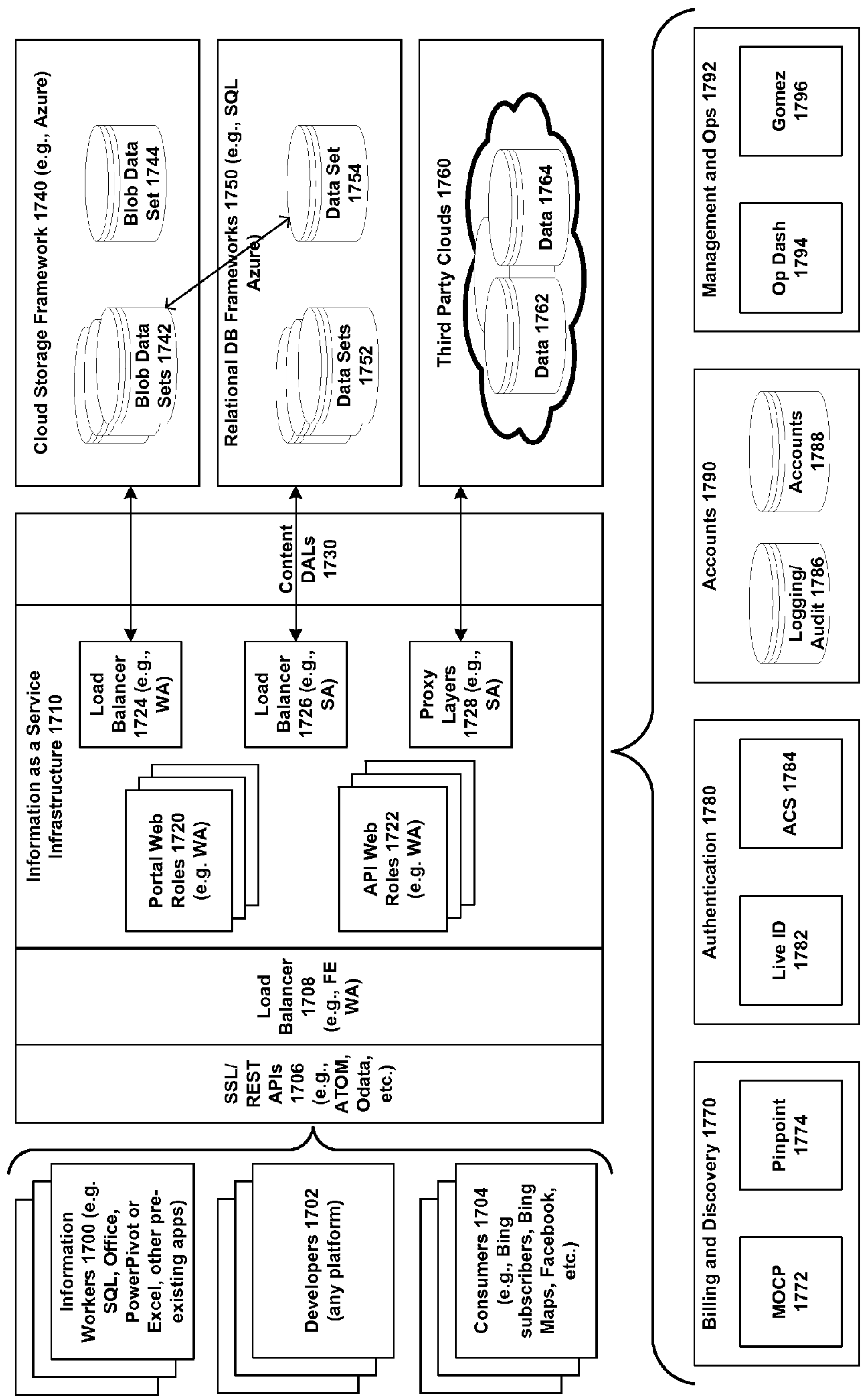
FIG. 17 is a block diagram illustrating an exemplary non-limiting set of implementation specific details for an infrastructure for information provided as a service from any platform.

FIG. 17 is an exemplary non-limiting implementation of the infrastructure 1710 for information as a service as described above according to one or more features. At the interaction side are information workers 1700, developers 1702 and consumers 1704 who can communicate with the infrastructure via SSL/REST based APIs 1706. A load balancer 1708 can be used to help steer traffic in an optimal way. In this regard, the input is routed to portal web roles 1720 or API web roles 1722. From the infrastructure 1710 to the data side is additional load balancing 1724 or 1726 (e.g., WA or SA) for access to blob data sets 1742, or blob data set 1755 of cloud storage framework 1740, or to data sets 1752 or data set 1754 of relational database frameworks 1750. Proxy layers 1728 can be used to access data 1762 or data 1764 of third party clouds 1760. Content data abstract layers (DALs) 1730 can be used to access content, where applicable. In this regard, there can be duplication or overlap of data sets across different types of storage, e.g., the same data might be represented as blob data and as structured data, e.g., SQL.

As supplemental services to the data, billing and discovery services 1770 can include online billing 1772 (e.g., MOCP) or discovery services 1774 (e.g., pinpoint) and authentication services 1780 can include credentials management 1782 (e.g., Live ID) or content authentication 1784, e.g., authenticated content services (ACS). Accounts services 1790 can include logging/audit services 1786 or account management 1788. Management and operations services 1792 can include an operations dashboard service 1794 and network operations service 1796, e.g., Gomez.

Figure 18:
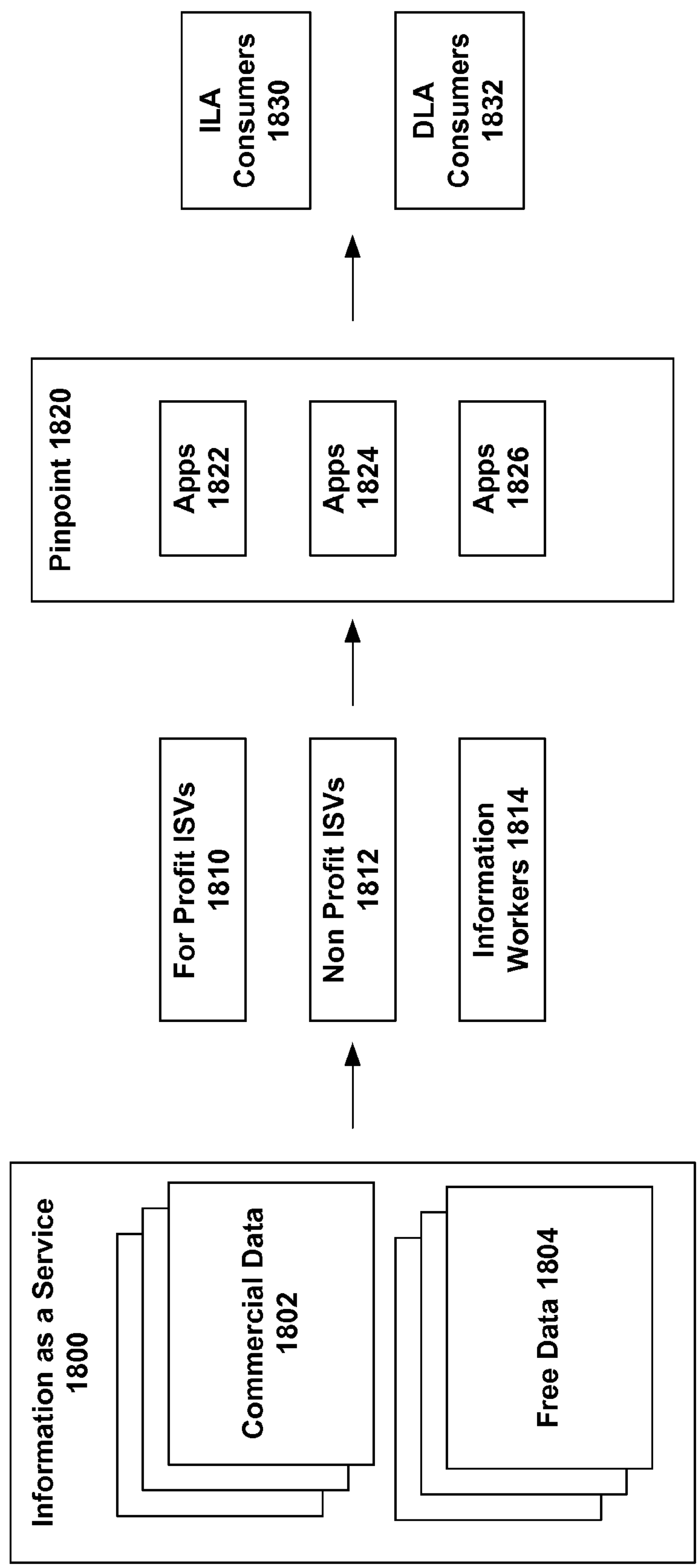
FIG. 18 is illustrative of exemplary consumption of data from an exemplary infrastructure for information provided as a service from any platform.

FIG. 18 is a block diagram illustrating an exemplary end to end flow from data to consumers of the data in accordance with one or more embodiments of the general infrastructure for enabling information as a service. For instance, information as a service 1800 can include commercial data 1802 and free data 1804, which can be of interest to various for profit developers 1810, non profit developers 1812 with non-profit motives and other information workers 1814 who are interested in consuming the data generally for productive goals. These entities can use discovery services 1820 to determine what applications 1822, 1824, . . . , 1826 may be of interest to them, and to ultimately transmit the data to ILA consumers 1830 and DLA consumers 1832 alike.

The Open Data Protocol

Those skilled in the art will appreciate that network interactions and information services may be practiced with a variety of computer system configurations and protocols. In this regard, one non-limiting implementation for querying and updating data that can be used in one or more embodiments described herein is the Open Data Protocol (OData).

OData is a web protocol for querying and updating data. OData applies web technologies such as HyperText Transfer Protocol (HTTP), Atom Publishing Protocol (AtomPub) and JavaScript Object Notation (JSON) to provide access to information from a variety of applications, services, and stores. For some general background, OData emerged organically based on the experiences implementing AtomPub clients and servers in a variety of products over the past several years. OData can be used to expose and access information from a variety of sources, including, but not limited to, relational databases, file systems, content management systems, and traditional web sites. OData has been released under the Open Specification Promise (OSP) to allow anyone to freely interoperate with OData implementations, in order to encourage growth of the ecosystem. Features of OData can be incorporated into other protocols as well to form hybrid protocols with similar functionality for querying and updating network data.

OData is consistent with the way the web works. In one aspect, OData uses universal resource identifiers (URIs) as a way to identify resources and uses an HTTP-centric protocol with a uniform interface for interacting with those resources, e.g., similar to the way that the Internet works. In one non-limiting aspect, OData builds on the conventions over HTTP popularized by AtomPub, which have simplified the process of sharing data, content and information across independently developed systems. OData defines additional conventions that implementations may optionally implement to support basic query and schema information to be exchanged. To simplify integration with HTML and JavaScript clients, OData defines an optional JSON representation of the protocol that complements the XML-based AtomPub format. As one can appreciate, additional implementation specific or other details regarding the OData protocol can be found at www.odata.org.

Exemplary Networked and Distributed Environments

One of ordinary skill in the art can appreciate that the various embodiments of methods and devices for an infrastructure for information as a service from any platform and related embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 19:
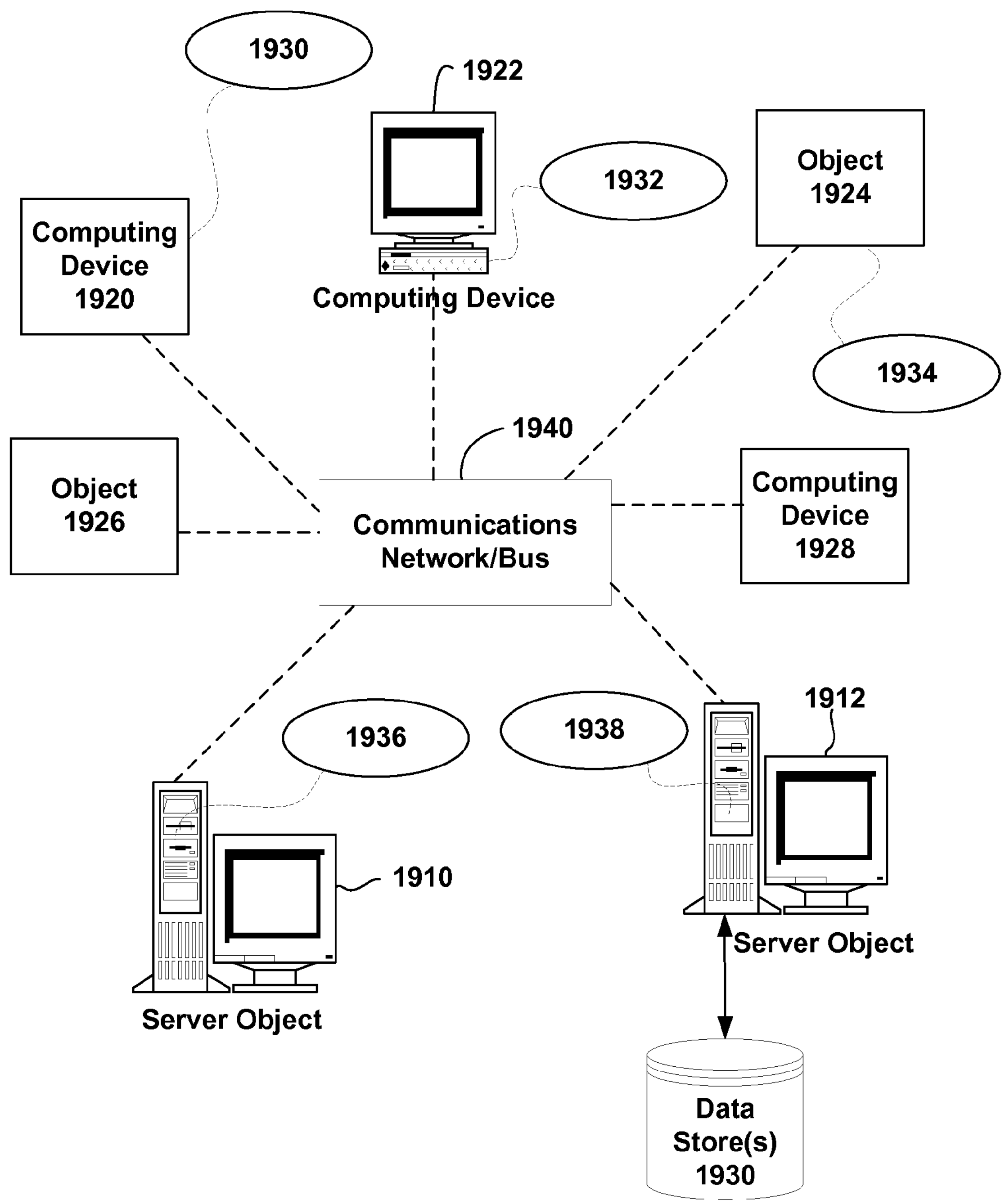
FIG. 19 is a block diagram representing exemplary non-limiting networked environments in which various embodiments described herein can be implemented.

FIG. 19 provides a non-limiting schematic diagram of an exemplary networked or distributed computing environment. The distributed computing environment comprises computing objects or devices 1910, 1912, etc. and computing objects or devices 1920, 1922, 1924, 1926, 1928, etc., which may include programs, methods, data stores, programmable logic, etc., as represented by applications 1930, 1932, 1934, 1936, 1938. It can be appreciated that computing objects or devices 1910, 1912, etc. and computing objects or devices 1920, 1922, 1924, 1926, 1928, etc. may comprise different devices, such as PDAs, audio/video devices, mobile phones, MP3 players, laptops, etc.

Each object 1910, 1912, etc. and computing objects or devices 1920, 1922, 1924, 1926, 1928, etc. can communicate with one or more other computing objects or devices 1910, 1912, etc. and computing objects or devices 1920, 1922, 1924, 1926, 1928, etc. by way of the communications network 1940, either directly or indirectly. Even though illustrated as a single element in FIG. 19, network 1940 may comprise other computing objects and computing devices that provide services to the system of FIG. 19, and/or may represent multiple interconnected networks, which are not shown. Each computing object or device 1910, 1912, etc. or 1920, 1922, 1924, 1926, 1928, etc. can also contain an application, such as applications 1930, 1932, 1934, 1936, 1938, that might make use of an API, or other object, software, firmware and/or hardware, suitable for communication with or implementation of an infrastructure for information as a service from any platform as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 19, as a non-limiting example, computing objects or devices 1920, 1922, 1924, 1926, 1928, etc. can be thought of as clients and computing objects or devices 1910, 1912, etc. can be thought of as servers where computing objects or devices 1910, 1912, etc. provide data services, such as receiving data from computing objects or devices 1920, 1922, 1924, 1926, 1928, etc., storing of data, processing of data, transmitting data to computing objects or devices 1920, 1922, 1924, 1926, 1928, etc., although any computer can be considered a client, a server, or both, depending on the circumstances. Any of these computing devices may be processing data, or requesting services or tasks that may implicate an infrastructure for information as a service from any platform and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 1940 is the Internet, for example, the computing objects or devices 1910, 1912, etc. can be Web servers with which the computing objects or devices 1920, 1922, 1924, 1926, 1928, etc. communicate via any of a number of known protocols, such as HTTP. As mentioned, computing objects or devices 1910, 1912, etc. may also serve as computing objects or devices 1920, 1922, 1924, 1926, 1928, etc., or vice versa, as may be characteristic of a distributed computing environment.

Exemplary Computing Device

As mentioned, various embodiments described herein apply to any device wherein it may be desirable to implement one or pieces of an infrastructure for information as a service from any platform. It can be understood, therefore, that handheld, portable and other computing devices and computing objects of all kinds are contemplated for use in connection with the various embodiments described herein, i.e., anywhere that a device may provide some functionality in connection with an infrastructure for information as a service from any platform. Accordingly, the below general purpose remote computer described below in FIG. 19 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 20:
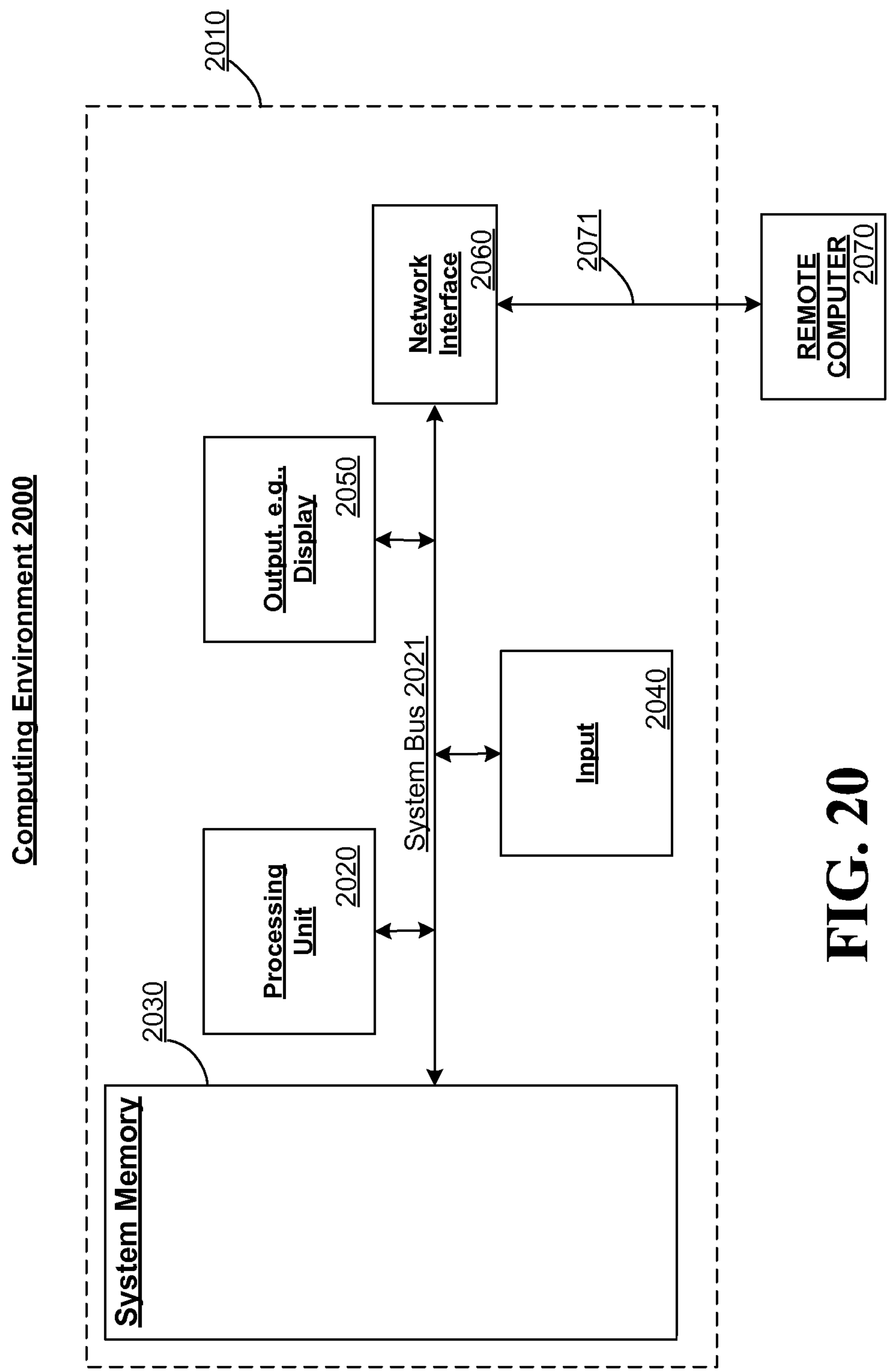
FIG. 20 is a block diagram representing an exemplary non-limiting computing system or operating environment in which one or more aspects of various embodiments described herein can be implemented.

FIG. 20 thus illustrates an example of a suitable computing system environment 2000 in which one or more of the embodiments may be implemented, although as made clear above, the computing system environment 2000 is only one example of a suitable computing environment and is not intended to suggest any limitation as to the scope of use or functionality of any of the embodiments. Also, the computing environment 2000 is not to be interpreted as having any dependency or requirement relating to any one or combination of components illustrated in the exemplary operating environment 2000.

With reference to FIG. 20, an exemplary remote device for implementing one or more embodiments herein can include a general purpose computing device in the form of a handheld computer 2010. Components of handheld computer 2010 may include, but are not limited to, a processing unit 2020, a system memory 2030, and a system bus 2021 that couples various system components including the system memory to the processing unit 2020.

Computer 2010 typically includes a variety of computer readable media and can be any available media that can be accessed by computer 2010. The system memory 2030 may include computer storage media in the form of volatile and/or nonvolatile memory such as read only memory (ROM) and/or random access memory (RAM). By way of example, and not limitation, memory 2030 may also include an operating system, application programs, other program modules, and program data.

A user may enter commands and information into the computer 2010 through input devices 2040 A monitor or other type of display device is also connected to the system bus 2021 via an interface, such as output interface 2050. In addition to a monitor, computers may also include other peripheral output devices such as speakers and a printer, which may be connected through output interface 2050.

The computer 2010 may operate in a networked or distributed environment using logical connections to one or more other remote computers, such as remote computer 2070. The remote computer 2070 may be a personal computer, a server, a router, a network PC, a peer device or other common network node, or any other remote media consumption or transmission device, and may include any or all of the elements described above relative to the computer 2010. The logical connections depicted in FIG. 20 include a network 2071, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to publish, build applications for or consume data in connection with interactions with a cloud or network service.

There are multiple ways of implementing one or more of the embodiments described herein, e.g., an appropriate API, tool kit, driver code, operating system, control, standalone or downloadable software object, etc. which enables applications and services to use the infrastructure for information as a service from any platform. Embodiments may be contemplated from the standpoint of an API (or other software object), as well as from a software or hardware object that facilitates provision of an infrastructure for information as a service from any platform in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating therefrom. Still further, one or more aspects of the above described embodiments may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for hosting data or connecting to hosted data, comprising:

receiving, by at least one computing device in a first region of control, from at least one computing device in a second region of control via at least one network, at least one data set published by the at least one computing device in the second region of control;

analyzing the at least one data set to determine structural information associated with at least a subset of data of the at least one data set; and rendering the structural information to the at least one computing device in the second region of control to receive input regarding at least one query capability to enforce over the at least one data set by the at least one computing device in the first region of control.

2. The method according to claim 1, wherein the analyzing includes determining column information associated with the at least one data set.

3. The method according to claim 1, wherein the rendering includes rendering the structural information to the at least one computing device in the second region of control to receive input regarding a plurality of distinct query capabilities to enforce over the at least one data set.

4. The method according to claim 1, further comprising:

receiving search parameter input from the at least one computing device in the second region of control defining first structural information of the structural information over which at least one authorized consuming device is authorized to search the at least one data set.

5. The method according to claim 4, further comprising:

receiving search result input from the at least one computing device in the second region of control defining second structural information of the structural information for which at least one authorized consuming device is authorized to receive results from the at least one data set.

6. The method according to claim 5, further comprising:

automatically generating a query interface based on the search parameter input and the search result input for at least one authorized consuming device to use to search the at least one data set according to query constraints defined by the search parameter input and the search result input.

7. The method according to claim 6, further comprising:

combining the query interface with at least one other query interface according to same or similar search parameter input based on comparing the query interface with the at least one other query interface.

8. The method according to claim 6, further comprising:

combining the query interface with at least one other query interface according to same or similar search results input based on comparing the query interface with the at least one other query interface.

9. The method according to claim 1, further comprising:

receiving search result input from the at least one computing device in the second region of control defining second structural information of the structural information for which at least one authorized consuming device is authorized to receive results from the at least one data set.

10. A computing system for hosting data or connecting to hosted data published by publishers and consumed by consumers via queries, the computing system comprising:

a processor and a memory containing instructions that when executed by the processor provide:

an information service component configured to receive at least one data set published by a publishing device and to determine structural information associated with at least one subset of data of the received at least one data set published by the publishing service; and a query definition component configured to present the determined structural information associated with the at least one subset of data of the at least one data set to the publishing service and configured to receive, from the publishing service, at least one selection of a structural feature of the presented structural information to define at least one query capability for enforcement over the at least one data set by the information service component.

11. The computing, system according to claim 10 wherein the instructions when executed by the processor further provide:

a query generator configured to generate a query interface, in response to receiving the at least one selection of the input, for querying over the at least one data set by at least one consuming device.

12. The computing system according to claim 10 wherein the instructions when executed by the processor further provide:

a query aggregator configured to combine the query interface with at least one other query interface.

13. The computing system according to claim 12, wherein the query aggregator is configured to combine the query interface with the at least one other query interface according to same or similar query definition based on a comparison of the query interface with the at least one other query interface.

14. The computing system according to claim 10 wherein the instructions when executed by the processor further provide:

a query optimizer configured to optimize at least one data store storing the at least one data set, in response to receiving the at least one selection of the input.

15. The computing system according to claim 10, wherein the query definition component is configured to present column information of the at least one data set determined by the information service component from an analysis of the at least one data set.

16. A method for publishing data, comprising:

publishing, by at least one publishing computing device in a first region of control to at least one receiving computing device in a second region of control, at least one data set;

interfacing to an interface, generated by the at least one receiving computing device in the second region of control, including information relating to structured information associated with the at least one data set based on an analysis of the at least one data set by the at least one receiving computing device; and selecting at least one search parameter from the structured information for searching by at least one consuming device over the at least one data set based on the at least one search parameter.

17. The method according to claim 16, further comprising:

transmitting the at least one search parameter to the at least one receiving device for automatic generation of a query interface for querying over the at least one data set.

18. The method according to claim 16, further comprising:

selecting at least one search result option from the structured information for receiving results by the at least one consuming device in response to the searching with the at least one search parameter.

19. The method according to claim 18, further comprising:

transmitting the at least one search result option to the at least one receiving device for automatic generation of a query interface that returns search results based on the at least one search result option.

20. The method according to claim 16, wherein the interfacing includes interfacing to the interface including information relating to columns associated with the at least one data set.

21. A computer storage medium storing computer-readable instructions that when executed by a processor perform actions comprising:

receiving, by at least one computing device in a first region of control, from at least one computing device in a second region of control via at least one network, at least one data set published by the at least one computing device in the second region of control;

analyzing the at least one data set to determine structural information associated with at least a subset of data of the at least one data set; and rendering the structural information to the at least one computing device in the second region of control to receive input regarding at least one query capability to enforce over the at least one data set by the at least one computing device in the first region of control.

22. The computer storage medium according to claim 21, wherein analyzing includes determining column information associated with the at least one data set.

23. The computer storage medium according to claim 21, wherein rendering includes rendering the structural information to the at least one computing device in the second region of control to receive input regarding a plurality of distinct query capabilities to enforce over the at least one data set.

24. The computer storage medium according to claim 21, the actions further comprising:

receiving search parameter input from the at least one computing device in the second region of control defining first structural information of the structural information over which at least one authorized consuming device is authorized to search the at least one data set.

25. The computer storage medium according to claim 24, the actions further comprising:

receiving search result input from the at least one computing device in the second region of control defining second structural information of the structural information for which at least one authorized consuming device is authorized to receive results from the at least one data set.

26. The computer storage medium according to claim 25, the actions further comprising:

automatically generating a query interface based on the search parameter input and the search result input for at least one authorized consuming device to use to search the at least one data set according to query constraints defined by the search parameter input and the search result input.

27. The computer storage medium according to claim 26, the actions further comprising:

combining the query interface with at least one other query interface according to same or similar search parameter input based on comparing the query interface with the at least one other query interface.

28. The computer storage medium according to claim 26, the actions further comprising:

combining the query interface with at least one other query interface according to same or similar search results input based on comparing the query interface with the at least one other query interface.

29. The computer storage medium according to claim 21, the actions further comprising:

receiving search result input from the at least one computing device in the second region of control defining second structural information of the structural information for which at least one authorized consuming device is authorized to receive results from the at least one data set.

30. A method performed by a hosting computing device having a computing processor, the method comprising:

with the computing processor, receiving a data set from a publisher computing device associated with a data publisher via a computer network;

determining structural information associated with the received data set, the determined structural information including one or more structural features associated with the received data set;

presenting the determined structural information with the one or more structural features associated with the received data set to the publishing computing device via the computer network; and in response to presenting the determined structural information, receiving an input from the publishing computing device associated with the data publisher via the computer network, the received input including a query capability to be enforced by the hosting computing device over the received data set, wherein the query capability applies to at least one of the one or more structural features of the received data set.

31. The method according to claim 30 wherein the query capability to be enforced identifies one of the structural features over which a consuming device is authorized to search the received data set.

32. The method according to claim 30 wherein the query capability to be enforced identifies one of the structural features for which a consuming device is authorized to receive search results from the received data set.

33. The method according to claim 30 wherein the query capability to be enforced identifies one of the structural features over which a consuming device is authorized to search the received data set and identifies another one of the structural features for which a consuming device is authorized to receive search results from the received data set.

34. The method according to claim 30 wherein the query capability to be enforced identifies one of the structural features over which a consuming device is authorized to search the received data set or identifies one of the structural features for which a consuming device is authorized to receive search results from the received data set, and wherein the method further includes automatically generating a query interface for a consuming device to search the received data set according to the query capability to be enforced.

35. A method performed by a publishing computing device associated with a data publisher, the publishing computing device having computing processor, the method comprising:

with the computing processor, publishing a data set to a hosting computing device associated with a data hosting service;

receiving structural information associated with the data set published to the hosting computing device, the structural information including one or more structural features of the published data set; and selecting a search parameter to be enforced by the hosting computing device for searching the published data set by one or more consuming devices, the search parameter being applicable to one or more of the determined structural features of the published data set.

36. The method of claim 35 wherein the search parameter includes an identification of one of the structural features over which a consuming device is authorized to search the published data set, or an identification of one of the structural features for which a consuming device is authorized to receive search results from the received data set.

37. The method of claim 35 wherein the structural features include columns associated with the published data set, and wherein the search parameter includes an identification of one of the columns over which a consuming device is authorized to search the published data set.

38. The method of claim 35 wherein the structural features include columns associated with the published data set, and wherein the search parameter includes an identification of one of the structural features for which a consuming device is authorized to receive search results from the received data set.

39. The method of claim 35 wherein the structural features include columns associated with the published data set, and wherein the search parameter includes an identification of one of the columns over which a consuming device is authorized to search the published data set or for which a consuming device is authorized to receive search results from the received data set.

* * * * *